United States Patent
Bajwa et al.

(10) Patent No.: US 11,077,595 B2
(45) Date of Patent: Aug. 3, 2021

(54) SIDE-GATE INJECTION MOLDING APPARATUS AND SIDE-GATE NOZZLE ASSEMBLY

(71) Applicant: MOLD-MASTERS (2007) LIMITED, Georgetown (CA)

(72) Inventors: Gurvinder Bajwa, Brampton (CA); Chun Keung Mak, Markham (CA); Denis Babin, Georgetown (CA); Douglas Ursu, Orangeville (CA)

(73) Assignee: MOLD-MASTERS (2007) LIMITED, Georgetown (CA)

( * ) Notice: Subject to any disclaimer, the term of this patent is extended or adjusted under 35 U.S.C. 154(b) by 6 days.

(21) Appl. No.: 16/397,631

(22) Filed: Apr. 29, 2019

(65) Prior Publication Data

US 2019/0329469 A1    Oct. 31, 2019

Related U.S. Application Data

(60) Provisional application No. 62/663,635, filed on Apr. 27, 2018.

(51) Int. Cl.
B29C 45/27        (2006.01)

(52) U.S. Cl.
CPC ........ B29C 45/2737 (2013.01); B29C 45/278 (2013.01); B29C 45/2708 (2013.01); *B29C 2045/2716* (2013.01)

(58) Field of Classification Search
CPC .............. B29C 45/278; B29C 45/2708; B29C 2045/2716; B29C 45/2737
See application file for complete search history.

(56) References Cited

U.S. PATENT DOCUMENTS

| 5,324,191 A | 6/1994 | Schmidt |
| 5,503,545 A | 4/1996 | Benenati |
| 5,736,171 A | 4/1998 | McGrevy |
| 7,303,384 B2 | 12/2007 | Schreck |

(Continued)

FOREIGN PATENT DOCUMENTS

| CN | 206484826 U | 9/2017 |
| DE | 3501840 C2 | 5/1990 |

(Continued)

*Primary Examiner* — Xiao S Zhao
*Assistant Examiner* — Emmanuel S Luk
(74) *Attorney, Agent, or Firm* — Medler Ferro Woodhouse & Mills PLLC

(57) ABSTRACT

A side-gate injection molding apparatus and a side-gate nozzle assembly are disclosed. The side-gate nozzle assembly delivers moldable material to a cavity insert that is beside the side-gate nozzle assembly. The side-gate nozzle assembly includes a nozzle body having a nozzle flow channel and a widthwise slot extending across a downstream side of the nozzle body. The nozzle flow channel has an outlet that ends at a wall of the slot. A load component is received in the slot and has a load component flow channel in fluid communication between the nozzle body outlet and an outlet at an end of the load component. A side-gate tip assembly is adjacent to the end of the load component and is in fluid communication between the load component flow channel and the cavity insert. In operation, thermal expansion of the load component presses the side-gate tip assembly towards the cavity insert.

21 Claims, 16 Drawing Sheets

(56) References Cited

U.S. PATENT DOCUMENTS

| | | | | |
|---|---|---|---|---|
| 7,510,393 | B2* | 3/2009 | Glaesener | B22D 17/2272 |
| | | | | 425/572 |
| 7,658,606 | B2* | 2/2010 | Klobucar | B29C 45/281 |
| | | | | 425/564 |
| 7,794,228 | B2* | 9/2010 | Catoen | B29C 45/2735 |
| | | | | 425/549 |
| 8,066,505 | B2 | 11/2011 | Günther et al. | |
| 8,282,387 | B2* | 10/2012 | Braun | B29C 45/2735 |
| | | | | 425/549 |
| 8,821,151 | B2 | 9/2014 | Overfield et al. | |
| 8,899,964 | B2* | 12/2014 | Babin | B29C 45/22 |
| | | | | 425/568 |
| 8,932,046 | B2* | 1/2015 | Tabassi | B29C 45/2735 |
| | | | | 425/567 |
| 9,272,454 | B2 | 3/2016 | Overfield et al. | |
| 9,289,930 | B2 | 3/2016 | Overfield et al. | |
| 9,649,800 | B2* | 5/2017 | Spuller | B29C 45/2735 |
| 2008/0279978 | A1* | 11/2008 | Babin | B29C 45/2725 |
| | | | | 425/549 |
| 2013/0287884 | A1* | 10/2013 | Jenko | B29C 45/74 |
| | | | | 425/549 |

FOREIGN PATENT DOCUMENTS

| | | |
|---|---|---|
| EP | 2314438 B1 | 12/2009 |
| EP | 2308664 B1 | 10/2010 |
| JP | H04-8522 A | 1/1992 |
| KR | 10-2013-0139505 A | 6/2012 |
| KR | 10-1326250 B1 | 7/2012 |
| KR | 10-1768180 B1 | 9/2016 |
| WO | 2018/022192 A1 | 2/2018 |

* cited by examiner

SIDE-GATE INJECTION MOLDING APPARATUS AND SIDE-GATE NOZZLE ASSEMBLY

TECHNICAL FIELD

The present invention relates to injection molding, and more particularly to a side-gate injection molding apparatus, and a hot runner side-gate nozzle assembly for use in a side-gate injection molding apparatus.

SUMMARY

Embodiments hereof are directed to a side-gate nozzle assembly for delivering a stream of moldable material to a cavity insert located beside the side-gate nozzle assembly. The side-gate nozzle assembly includes a heated nozzle body having a nozzle body flow channel extending therethrough and a widthwise slot extending across a downstream side of the heated nozzle body. The nozzle body flow channel has a nozzle body outlet that ends at a wall of the slot. A load component is received in the slot, the load component has a load component flow channel that is in fluid communication between the nozzle body outlet and a load component outlet at an end of the load component. A side-gate tip assembly is adjacent to the end of the load component and is in fluid communication between the load component flow channel and the cavity insert. In operation, thermal expansion of the load component causes the end of the load component to press the side-gate tip assembly towards the mold cavity insert.

Embodiments hereof are directed to a side-gate injection molding apparatus including a pair of cavity inserts that are received in a mold plate; each cavity insert defines at least a portion of a mold cavity. A side-gate nozzle assembly is positioned between the pair of the cavity inserts. The side-gate nozzle assembly includes a heated nozzle body having a flow channel extending therethrough, a slot extending widthwise across a downstream side of the nozzle body, and a load component that is received in the slot. The load component has a pair of ends and a load component flow channel in fluid communication with the nozzle body flow channel and terminating at a load component outlet in each end. The side-gate nozzle assembly further includes a pair of side-gate tip assemblies, each side-gate tip assembly is received in a respective cavity insert and is disposed adjacent to a respective end of the load component. Each side-gate tip assembly has a tip member having a tip flow channel that is in fluid communication between the load component flow channel and a respective mold cavity via a mold gate. In operation, thermal expansion of the load component pushes the pair tip assemblies towards the respective cavity insert in which each tip assembly is received to promote a fluid seal between each load component outlet and a respective tip flow channel inlet.

BRIEF DESCRIPTION OF DRAWINGS

The foregoing and other features and advantages of the present disclosure will be apparent from the following description of embodiments thereof as illustrated in the accompanying drawings. The accompanying drawings, which are incorporated herein and form a part of the specification, further serve to explain the principles of the present disclosure and to enable a person skilled in the pertinent art to make and use the invention(s) taught in the present disclosure. The drawings may not be to scale.

DETAILED DESCRIPTION

Specific embodiments of the present disclosure are now described with reference to the figures, wherein like reference numbers indicate identical or functionally similar elements. The following detailed description is merely exemplary in nature and is not intended to limit the disclosure or the application and uses of the disclosure. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. Furthermore, there is no intention to be bound by any expressed or implied theory presented in the preceding technical field, background, summary or the following detailed description.

Figure 1:
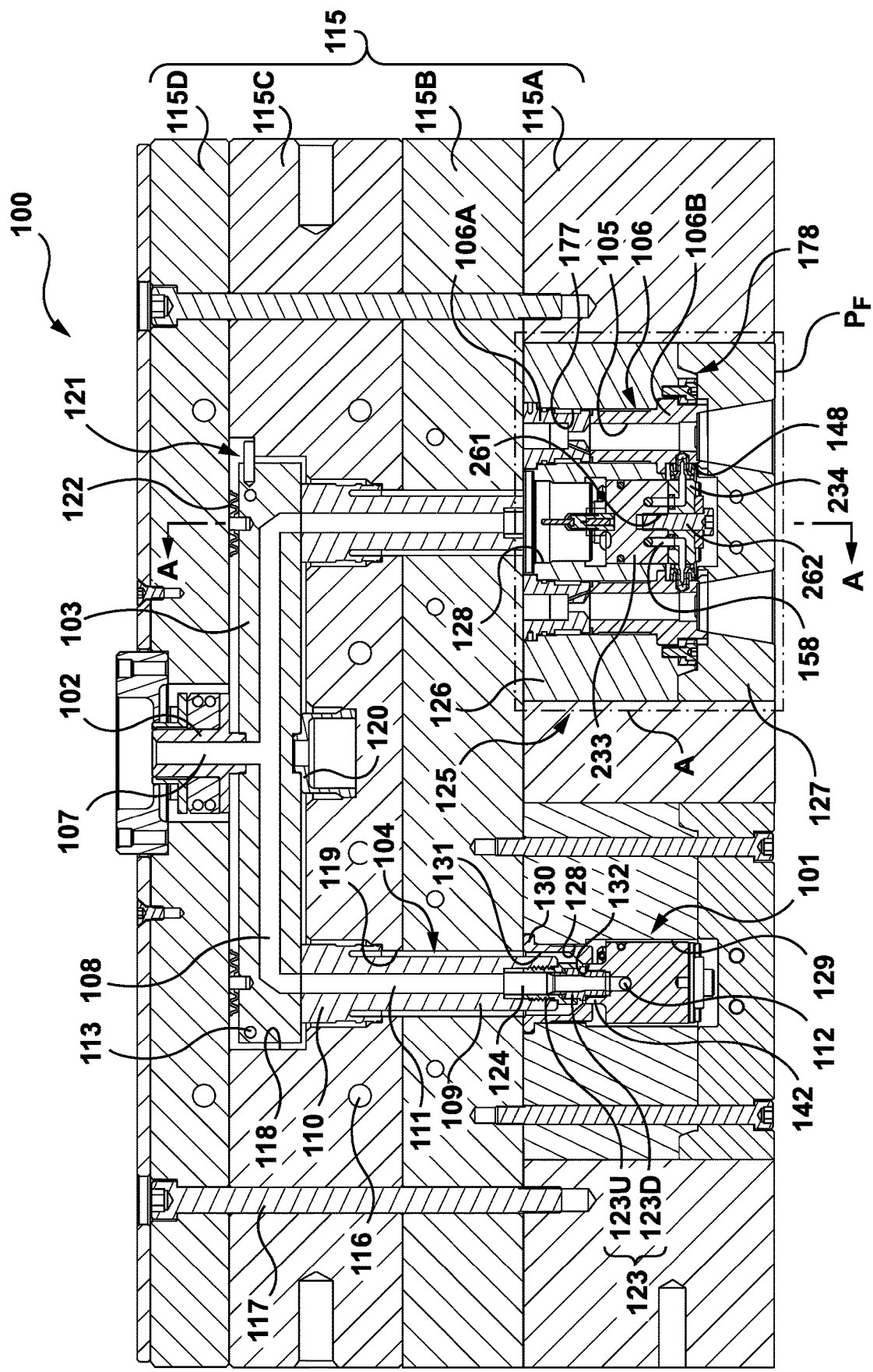
FIG. 1 is a sectional view of a side-gate injection molding apparatus having a side-gate nozzle assembly in accordance with an embodiment of the present disclosure; a portion "A" of FIG. 1 is taken along line A-A of FIG. 1A.
Figure 1A:
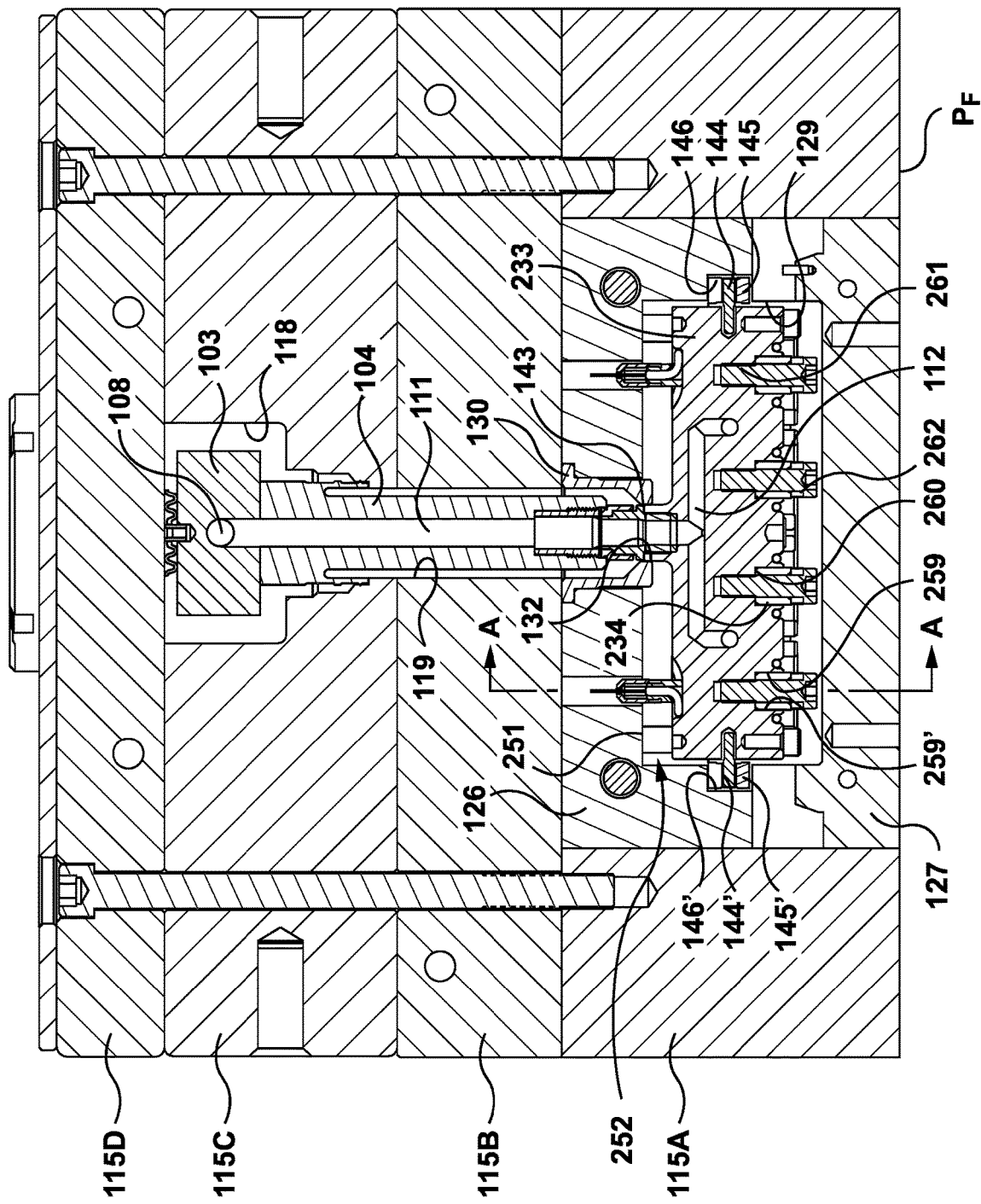
FIG. 1A is a sectional view of FIG. 1 taken along line A-A.

FIG. 1 is a sectional view of a side-gate injection molding apparatus 100 having a side-gate nozzle assembly 101 in accordance with an embodiment of the present disclosure. A portion "A" of FIG. 1 is taken along line A-A of FIG. 1A. Features and aspects of the present embodiment can be use with the other embodiments. Side-gate injection molding apparatus 100 includes, inter alia, an inlet component 102, a manifold 103 a transfer member 104, and side-gate nozzle assembly 101, which together direct a stream of moldable material under pressure from an injection molding machine (not shown) to a mold cavity 105, which is in part defined by a cavity insert 106 that is positioned beside side-gate nozzle assembly 101. Although side-gate nozzle assembly 101 is suitable for use in a variety of injection molding applications, as shown in FIG. 1 by way of example and not limitation, cavity insert 106 is shaped to define the outside surface of a slender article, for example, a syringe barrel. Together, inlet component 102, manifold 103, transfer member 104, and side-gate nozzle assembly 101 can be referred to as hot runner components and can collectively be referred to as a side-gate hot runner system. As shown in FIGS. 1 and 1A side-gate injection molding apparatus 100 includes two side-gate nozzle assemblies 101 by way of example and not limitation.

Inlet component 102 is coupled to manifold 103 and includes an inlet flow channel 107 extending therethrough for delivering the stream of moldable material, received from the machine nozzle, to a manifold flow channel 108 that extends through manifold 103, between a manifold inlet on an upstream side of manifold 103 and one or more manifold outlets on a downstream side of manifold 103, each of which is in fluid communication with a respective transfer member 104.

Transfer member 104 delivers molding material from manifold 103 to side-gate nozzle assembly 101. Transfer member 104 includes a body portion 109, a head portion 110 and a transfer flow channel 111 extending therethrough. Transfer flow channel 111 is in fluid communication between manifold flow channel 108 and a flow channel 112 that extends through side-gate nozzle assembly 101 and ends at a nozzle body outlet 158.

Inlet component 102 includes a heater, manifold 103 includes a heater, transfer member 104 includes a heater, and side-gate nozzle assembly 101 includes a heater. Example heaters for use in embodiments hereof include a wire element heater wrapped around or embedded within the hot runner component, such as heaters 113 (shown in FIG. 1) and 214 (shown in FIG. 2) called out on manifold 103 and side-gate nozzle assembly 101. Other suitable heaters include a band, cartridge, or film heater where suitable. Heaters, e.g. 113, 214, and thermocouples (not shown) associated therewith are connected to a hot runner controller (not shown) to control the temperature of the side-gate hot runner system so as to maintain the stream of moldable material at a suitable processing temperature.

Side-gate injection molding apparatus 100 includes a plurality of mold plates 115 such as, for example, a cavity plate 115A, an intermediate plate 115B, a manifold plate 115C, and a back plate 115D. Together, mold plates 115A, 115B, 115C, 115D form an opening in which the side-gate hot runner system is received. Cavity plate 115A, intermediate plate 115B, manifold plate 115C, and back plate 115D can individually be referred to as a mold plate 115A, 115B, 115C, 115D, or can be referred to collectively as mold plates 115. While four mold plates 115 are shown, more or fewer mold plates are contemplated. Mold plates 115 can include cooling channels, such as cooling channel 116 called out on manifold plate 115C, through which cooling fluid is circulated to maintain mold plates 115 at a suitable processing temperature. Mold plates 115 are held together by fasteners, for example fastener 117, which extends between, back plate 115D and cavity plate 115A, and may also include additional fastening/aligning components that are well known in the art of injection molding, such as, for example, dowels, guide pins, guide bushings, and the like. As shown in FIG. 1, side-gate injection molding apparatus 100, also includes a locating ring, by which side-gate injection molding apparatus 100 is positioned relative to a stationary platen of a molding machine (not shown).

The opening in which the side-gate hot runner system is received includes a manifold pocket 118 and a bore 119. As shown in FIG. 1, manifold pocket 118 is defined by manifold plate 115C, and is enclosed by back plate 115D. Manifold pocket 118 is sized to create an air space around manifold 103 which insulates manifold plate 115C and back plate 115D from manifold 103. A locator 120 positions manifold 103 within manifold pocket 118. Manifold 103 is further positioned within manifold pocket 118 by a slot and dowel arrangement, shown at 121. It should be appreciated that positioning manifold by way of locator 120 and slot and dowel 121 is by way of example and not limitation as person of ordinary skill in the art would understand that there are various ways to locate manifold 103 within injection molding apparatus 100.

Transfer member 104 extends from manifold 103 and is received within bore 119, which extends from manifold pocket 118, through manifold plate 115C and intermediate plate 115B. Bore 119 is sized to create an insulating air space around transfer member 104 which insulates manifold plate 115C and intermediate plate 115B from transfer member 104. At its upstream end, bore 119 is optionally stepped to create a shoulder in which head portion 110 is seated, to locate transfer member 104 relative to manifold plate 115C.

Manifold 103 is held in position between back plate 115D and manifold plate 115C by head portions 110 of respective transfer members 104 and spacers 122 located between manifold 103 and back plate 115D. In operation, thermal expansion of manifold 103 across its thickness (up and down in the page view of FIG. 1) causes manifold 103 to press against back plate 115D via spacers 122, and to press against manifold plate 115C via engagement between head portion 110 and the shoulder of bore 119 which creates a sealing force between manifold 103 and transfer member 104. It should be appreciated that the above described way that a sealing force is created between manifold 103 and transfer member 104 is by way of example and not limitation, as person of ordinary skill in the art would understand that there are various ways to create a sealing force between manifold 103 and transfer member 104.

As shown, transfer member 104 is held in place between manifold 103 and the shoulder of bore 119. Accordingly, thermal expansion of transfer member 104 causes the length of body portion 109 to elongate in the downstream direction. To accommodate this growth without exerting an expansion force against side-gate nozzle assembly 101, transfer member 104 and side-gate nozzle assembly 101 are slidably coupled together by a telescopic connection, shown at 123, which includes a linking channel 124 through which molding material can flow from transfer member 104 to side-gate nozzle assembly 101.

A non-limiting example of telescopic connection 123 includes an upstream connector component 123U attached to a downstream end of transfer member 104 and a downstream connector component 123D attached to an upstream side of side-gate nozzle assembly 101. Upstream and downstream connector components 123U, 123D are slidable relative to each other by way of a stepped sliding interface, shown at 123I. As such, transfer member 104 and side-gate nozzle assembly 101 are slidably coupled together via telescopic connector 123, whereby transfer flow channel 111 is in fluid communication with side-gate nozzle assembly flow channel 112 via linking channel 124 to facilitate fluid communication between flow channels 111, 112 of transfer member 104 and side-gate nozzle assembly 101. In an alternative embodiment (not shown), transfer member 104 is fixedly connected to, or is integrally part of, side-gate nozzle assembly 101, and thermal expansion of transfer member 104 is accommodated by a telescopic connection having a linking channel between transfer member 104 and manifold 103. In another embodiment (not shown) the transfer member is fixedly connected to or is integrally part of the side-gate nozzle assembly and thermal expansion the transfer member portion of the side-gate nozzle assembly is accommodated by relative movement between components of the-side-gate nozzle assembly 101.

Cavity plate 115A includes an opening extending therethrough in which a cavity insert assembly 125 is received. Cavity insert assembly 125 includes an insert holder 126, a plurality of cavity inserts 106, and a cover plate 127 which is removably fastened to insert holder 126. Although shown as separate components, insert holder 126 and cavity plate 115A can be a unitary structure in which the features of insert holder 126 are incorporated into a modified version of cavity plate 115A.

Insert holder 126 includes an opening extending therethrough which includes a bore 128 that extends through insert holder 126 and a nozzle pocket 129 connected to bore 128, and in which side-gate nozzle assembly 101 is received. A nozzle locator 130 is received in bore 128 which aligns nozzle locator 130 relative to insert holder 126. An opening 131 extends through nozzle locator 130, into which transfer member 104 and upstream connector component 123U project. At its downstream end, opening 131 includes an internal alignment surface 132, by which side-gate nozzle assembly 101 is aligned relative to insert holder 126. Locator 130 is optionally a separate component from insert holder 126. The shape of locator component, and locating features thereof, could be incorporated into a modified version of insert holder 126.

Figure 2:
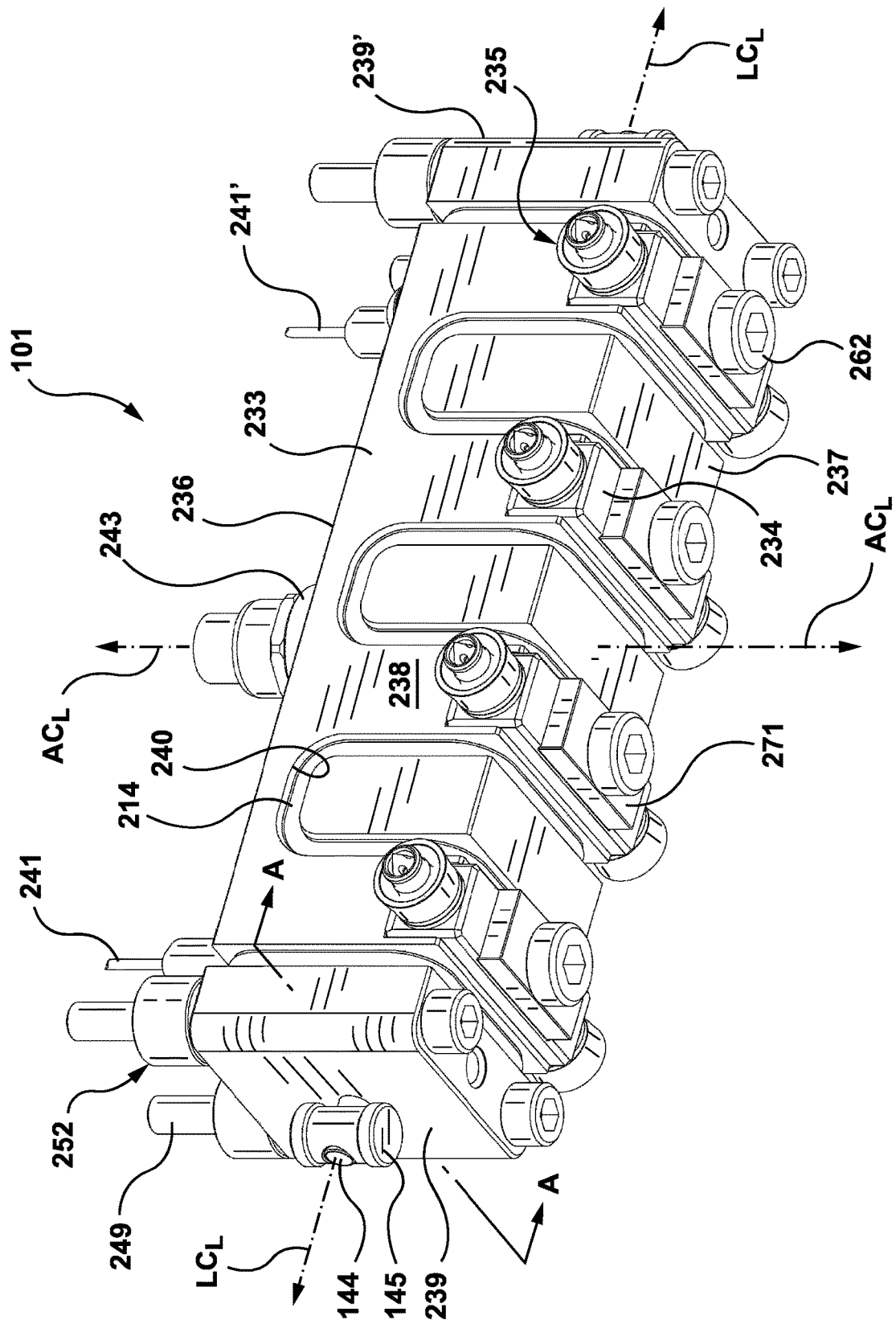
FIG. 2 is a bottom perspective view of the side-gate nozzle assembly removed from the side-gate injection molding apparatus of FIG. 1.

Continuing with FIG. 1, and referring also to FIG. 2, which is a bottom perspective view of side-gate nozzle assembly 101. Side-gate nozzle assembly 101 includes a nozzle body 233, a load component 234, and a side-gate tip assembly 235. Nozzle body 233 includes an upstream side 236, a downstream side 237, longitudinal sides 238, 238' (only one of which, longitudinal side 238, is visible in FIG. 2) and ends or distal sides 239, 239' (only one of which, distal side 239, is visible in FIG. 2). As shown in FIG. 2, nozzle body 233 can generally be described as having a cuboid shape. A length of nozzle body 233 is defined by the distance between its distal sides 239, 239', a width of nozzle body 233 is defined by the distance between its longitudinal sides 238, 238', and a thickness or height of nozzle body 233 is defined by the distance between its upstream side 236 and its downstream side 237. A longitudinal center line $LC_L$ of nozzle body 233 extends along its length through the midpoints of its width and its thickness, and an axial center line $AC_L$ of nozzle body 233 extends across its thickness through the midpoints of its length and its width. Nozzle body 233 includes a groove 240 formed therein, in which heater 214 is received. While configurable in a variety of ways, in the current embodiment groove 240 begins on upstream surface 236 at a terminal connection 241, and winds around or extends about nozzle body 233 and ends on upstream side 236 at another terminal connection 241'. Other configurations for groove 240 and heater 214 received therein are contemplated. Nozzle body 233 is made from a material that is used to make hot runner components through which molding material flows, a non-limiting example of which includes a tool steel, such as H13 or a mold steel such as Stavax.

Nozzle body 233 is located relative to insert holder 126 so as to create a reference point from which longitudinal thermal expansion (left and right as shown on the page view of FIG. 1A) and lateral thermal expansion (left and right as shown on the page view of FIG. 1) of nozzle body 233 can be calculated. One way of accomplishing this is shown in FIG. 1, in which nozzle body 233 includes an alignment feature 142 that projects from upstream side of nozzle body 233. Alignment feature 142 includes an alignment surface 243 (shown in FIG. 2) sized to be slidably received within internal alignment surface 132 in nozzle locator 130. As shown, alignment feature 142 and alignment surface 243 are coaxial with axial centerline $AC_L$ of nozzle body 233; however, alignment feature 142 and/or alignment surface 143 can also be positioned away from axial centerline $AC_L$. Also, as shown, alignment feature 142 is integral with nozzle body 233; however, alignment feature 143 can be formed as a discrete component that is attached to nozzle body 233.

Continuing with FIG. 2 and referring to FIG. 1 and FIG. 1A, nozzle body 233 is positioned between pairs of cavity inserts 106 which are located on either side thereof such that nozzle body 233 is centered or is substantially centered between pairs of cavity inserts 106. A non-limiting example of how this is accomplished is shown in FIG. 1A, which is a sectional view of FIG. 1 taken along line A-A. A dowel 144 projects lengthwise from an end of nozzle body 233 and is slidable into a cam member 145 that is received in a locating bore 146 in insert holder 126. Locating bore 146 is adjacent to nozzle pocket 129, and an opening extends therebetween through which dowel 144 extends when nozzle body 233 is installed into insert holder 126. Cam member 145 can be slotted on its upper side (as shown in the page view of FIG. 1A) to facilitate insertion or retraction of cam member 146 into or out of locating bore 146 without also having to insert or remove nozzle body 233 from nozzle pocket 129.

With this configuration, when nozzle body 233 is installed within nozzle pocket 129, engagement between locating surface 143 and internal locating surface 132 of nozzle locator 130, in combination with engagement between dowel 144 and cam member 145, received in locating bore 146, the longitudinal centerline $LC_L$ of nozzle body 233 is held in position midway between respective bearing surfaces 148, (shown in FIG. 1) of cavity inserts 106 that are positioned on either side of the longitudinal centerline $LC_L$ of side-gate nozzle assembly 101. As shown in FIGS. 1A and 2, nozzle body 233 optionally includes a dowel 144, 144' and cam member 145, 145' at each of its ends, and insert holder 126 likewise includes a second locating bore 146', adjacent to nozzle pocket 129 and opposite to locating bore 146, and in which the second dowel 144' and cam member 145' are received.

Figure 2A:
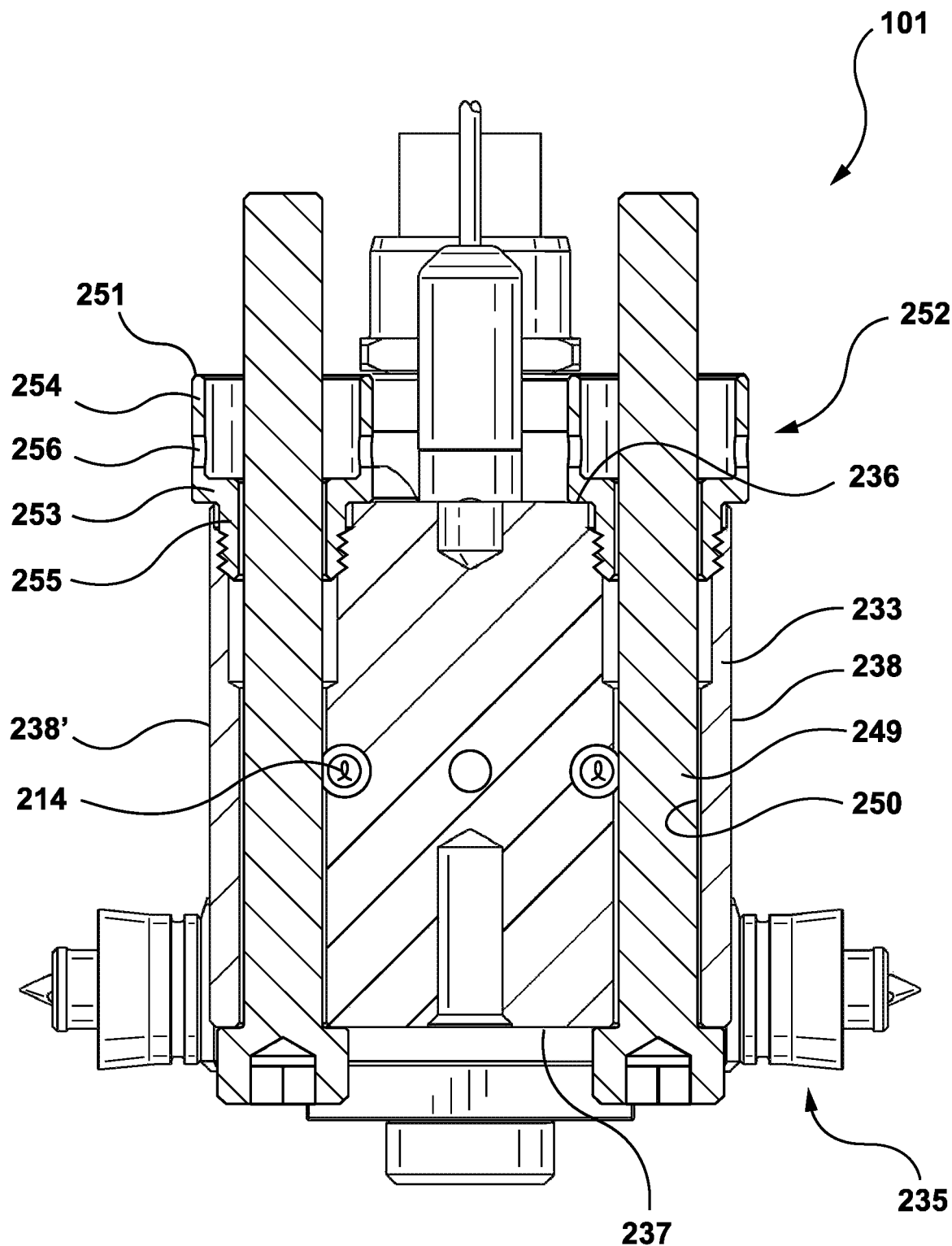
FIG. 2A is a sectional view of FIG. 2 taken along line A-A.

Continuing with FIG. 1A, FIG. 2 and referring to FIG. 2A, which is a sectional view of FIG. 2 taken along line A-A. Nozzle body 233 is secured within nozzle pocket 129 against injection pressure force when injection molding apparatus 100 is in use. For example, nozzle body 233 is attached to insert holder 126 by fasteners 249 which hold nozzle body 233 in place in nozzle pocket 129. As shown in FIGS. 2 and 2A by way of example and not limitation, a plurality of bores 250 extend heightwise through nozzle body 233 through which a respective fastener 249 extends. Each fastener 249 is received in a complementary threaded hole 261 (not shown) at the bottom of nozzle pocket 129, such that nozzle body 233 is releasably attached to insert holder 126. Fasteners 249 are accessible from a parting face $P_F$ of side-gate injection molding apparatus 100 upon removal of cover plate 127 from insert holder 126. In this configuration, side-gate nozzle assembly 101 or components thereof are accessed from the parting face $P_F$ of side-gate injection molding apparatus 100. Once nozzle body 233 is secured to insert holder 126, cam member 145 can optionally be removed from locating bore 146 to limit heat transfer from nozzle body 233 through dowel 144 to insert holder 126. Optionally, a washer (not shown), made from a material that is less thermally conductive than the material from which nozzle body 233 is made, is positioned between a head portion of fastener 249 and downstream side 237 of nozzle body 233 to reduce the amount of heat loss from nozzle body 233 to insert holder 126 via fasteners 249. A non-limiting example of a suitable material for washer includes a titanium alloy.

Nozzle body 233 is seated against a spacer 252 which is located between nozzle body 233 and insert holder 126. Spacer 252 creates an insulative air space between nozzle body 233 and insert holder 126. Spacer 252 establishes the axial height of nozzle body 233 relative to insert holder 126 to create a reference point from which heightwise thermal expansion of nozzle body 233 can be calculated. As nozzle body 233 is heated, thermal expansion of nozzle body 233 across its thickness occurs in the downward direction (in page view of FIG. 2A) from its upstream side 236 which is seated against spacer 252. Although nozzle body 233 is held to insert holder 126 by fasteners 249, heat transfer from nozzle body 233 to fastener 449 causes fastener 249 to elongate downward (in page view of FIG. 2A) which limits strain on nozzle body 233 and/or fastener 249 when nozzle body 233 is heated. By way of example and not limitation, generally more than one spacer 252, i.e. a set or plurality of spacers 252, is used to support nozzle body 233 within nozzle pocket 129. While spacers 252 are shown attached to nozzle body 233, spacers 252 could alternatively be coupled to insert holder 126 for example, against the bottom surface of nozzle pocket 129.

A non-limiting example of spacer 252 is shown in FIG. 2A. Spacer 252 includes a base 253 seated against upstream side 236 of nozzle body 233. A skirt 254 projects from base 253 to define a bearing surface 251 which seats against the bottom of nozzle pocket 129 (shown in FIG. 1A). A cross-sectional size of skirt 254 is selected to provide sufficient support to nozzle body 233 while also minimizing heat loss to insert holder 126 from nozzle body 233. A sleeve 255 projects from base 253 away from skirt 254 and is received in an enlarged portion of bore 250 through which fastener 249 extends. In the current non-limiting embodiment, spacer 252 is threadably fastened to nozzle body 233, by for example, a threaded interface between sleeve 255 and bore 250; however, other connection arrangements between spacer 252 and nozzle body 233 are contemplated, non-limiting examples of which include an interference fit connection and a slide fit connection, among others. To facilitate installation and removal of spacer 252 from nozzle body 233, spacer 252 optionally includes a tool engageable feature, for example, a hole shown at 256 that extends across skirt, through which a rod or lever may be inserted to assist in removing spacer 252 from nozzle body 233. By way of example and not limitation, spacer 252 is generally made from a material which is less thermally conductive than the material selected for nozzle body 233, an example of such a material includes titanium or a titanium alloy. However, depending on the geometry of spacer 252, e.g. the amount of contact between spacer 252 and nozzle body 233, spacer can be made from the same material as that of nozzle body 233.

Figure 2B:
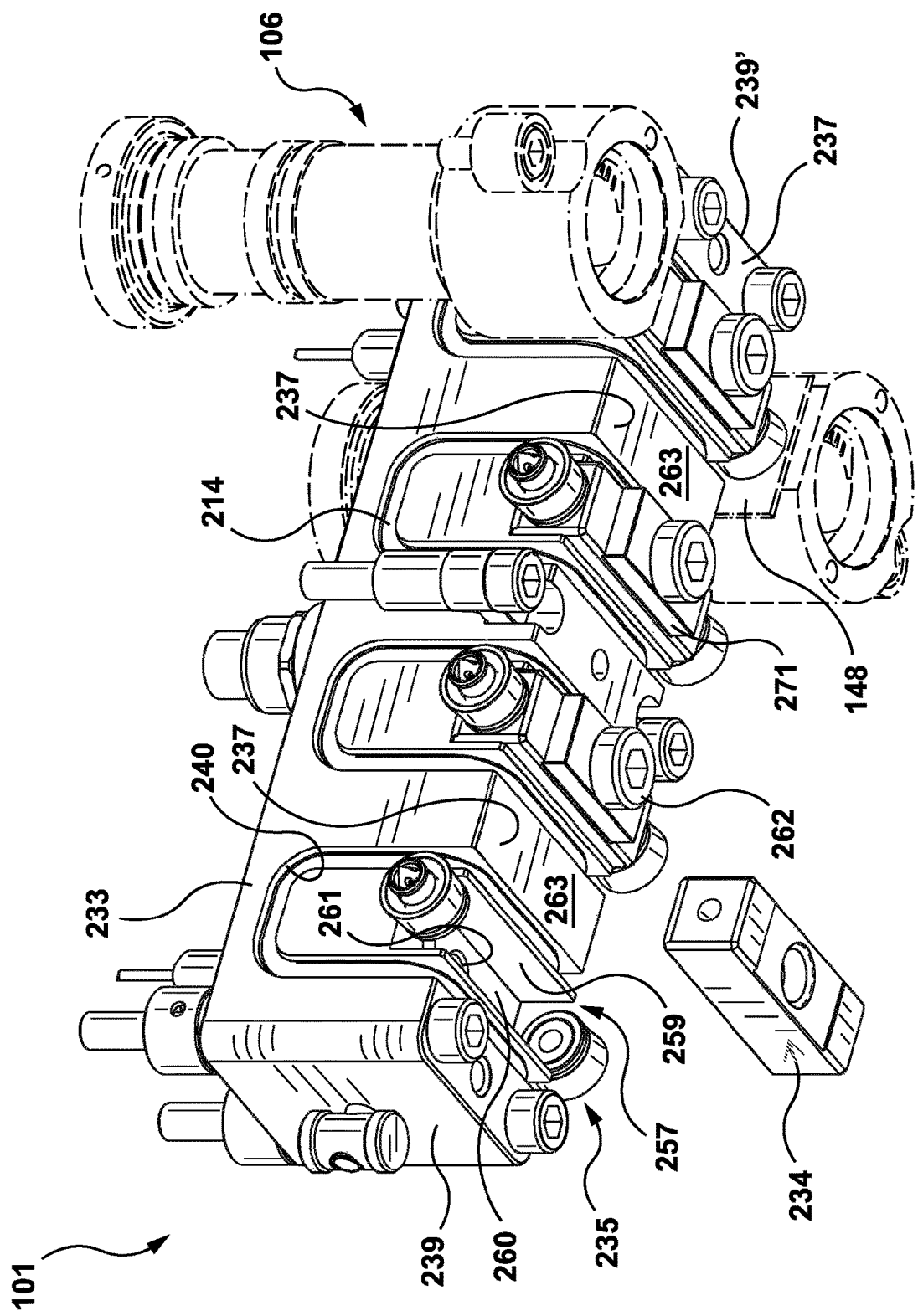
FIG. 2B is the bottom perspective view of the side-gate nozzle assembly of FIG. 2 shown with a load component removed from of a nozzle body of the side-gate nozzle assembly and showing the position of two cavity inserts (shown in phantom) relative to the side-gate nozzle assembly as they would be when assembled in the side-gate injection molding apparatus.

Continuing with FIG. 2 and referring to FIG. 2B, which is the bottom perspective view of side-gate nozzle assembly of FIG. 2 shown with load component 234 removed from nozzle body 233 and showing the position of two cavity inserts 106 (in phantom) relative to side-gate nozzle assembly 101 as they would be when assembled in side-gate injection molding apparatus 100. A slot 257 extends across the width of nozzle body 233 in which a respective load component 234 is received. Nozzle body outlet 158 ends at a wall of slot 257. Slot 257 segments the downstream side 237 of nozzle body 233 into a plurality of downstream surface segments. Slot 257 is shaped such that load component 234 is installed into and is removed from slot 257 by way of axial displacement of load component 234 from nozzle body 233. Slot 257 can be described an open-ended trough-like feature that extends across the width of the downstream side 237 of nozzle body 233. Slot 257 includes a pair of side walls 259, 259', one of which is visible in FIG. 2B and both are visible in FIG. 1A, and a bottom wall 260, which extends between the pair of side walls 259, 259'. In the current embodiment, bottom wall 260 is perpendicular to the pair of side walls 259, 259'. In other words, slot 257 includes a bottom wall 260 which is recessed into nozzle body 233 (relative to downstream side 237) and is connected to downstream side 237 by side walls 259, 259'. In the current embodiment, when installed into slot 257, load component 234 is disposed between the pair of side walls 259, 259' and seats against bottom wall 260, which includes a threaded or fastening bore 261 for receiving a fastener 262 by which load component 234 is held against bottom wall 260. Although side walls 259, 259' are shown as shown connected to bottom wall 260 at a 90° connection, the connection therebetween can also be filleted beveled or relieved if necessary to facilitate seating load component 234 against bottom wall 260. Slot 257 segments the downstream side of nozzle body 233 into a plurality of partitions or abutments 263 such that each load component 234 is positioned between an adjacent pair of abutments 263. Abutments 263 can be either internal abutments 263 or external or abutments 263. Internal abutments 263 are those formed by a segment of downstream side 237 and oppositely facing pairs of sidewalls 259, 259' of adjacent slots 257. external abutments 263 are those formed by a segment of downstream side 237, a respective sidewall 259, 259' of a slot 257 and a respective distal side 239, 239' of nozzle body 233.

As shown, side-gate nozzle assembly 101, or more particularly nozzle body 233 includes four slots 257 that extend laterally across nozzle body 233 in which four respective load components 234 are received and are removably coupled to nozzle body 233. In this configuration of side-gate nozzle assembly 101, nozzle body 233 includes five partitions (three internal partitions 263, and two external partitions 263), and a respective load component 234 is seated between adjacent pairs of partitions. However, the embodiment of side-gate nozzle assembly 101 described above is by way of example and not limitation. In alternative embodiments of the side-gate nozzle assembly, the nozzle body can have other than four slots that extend laterally or widthwise across the nozzle body, in which a load component 234 is seated and is removably coupled to the nozzle body 233. For example, nozzle body 233 can be shaped to include only one slot that extends laterally across nozzle body 233, in which a respective load component is seated and is removably coupled to the nozzle body. Accordingly, in this configuration of side-gate nozzle assembly 101, nozzle body 233 includes two abutments, between which the load component is positioned. A non-limiting example of such an embodiment is discussed below with regard to FIGS. 7-7C.

Continuing with FIGS. 1, 2 and 2B, load component 234 is shaped such that it is installed into and removed from slot 257 by way of pulling load component 234 away from bottom wall 260 slot 257. Upon detachment of cover plate 127 from insert holder 126, load component 234 may be assembled with or disassembled from nozzle body 233. When load component 234 is removed from slot 257, one or both side-gate tip assemblies 235 associated with the removed load component 234 can be extracted from its respective cavity insert 106, into slot 257, or can be installed into its respective cavity insert 106 via slot 257, thus facilitating maintenance and/or replacement of side-gate tip assemblies 235 and/or load components 234 from a parting face $P_F$ of side-gate injection molding apparatus 100.

Figure 3:
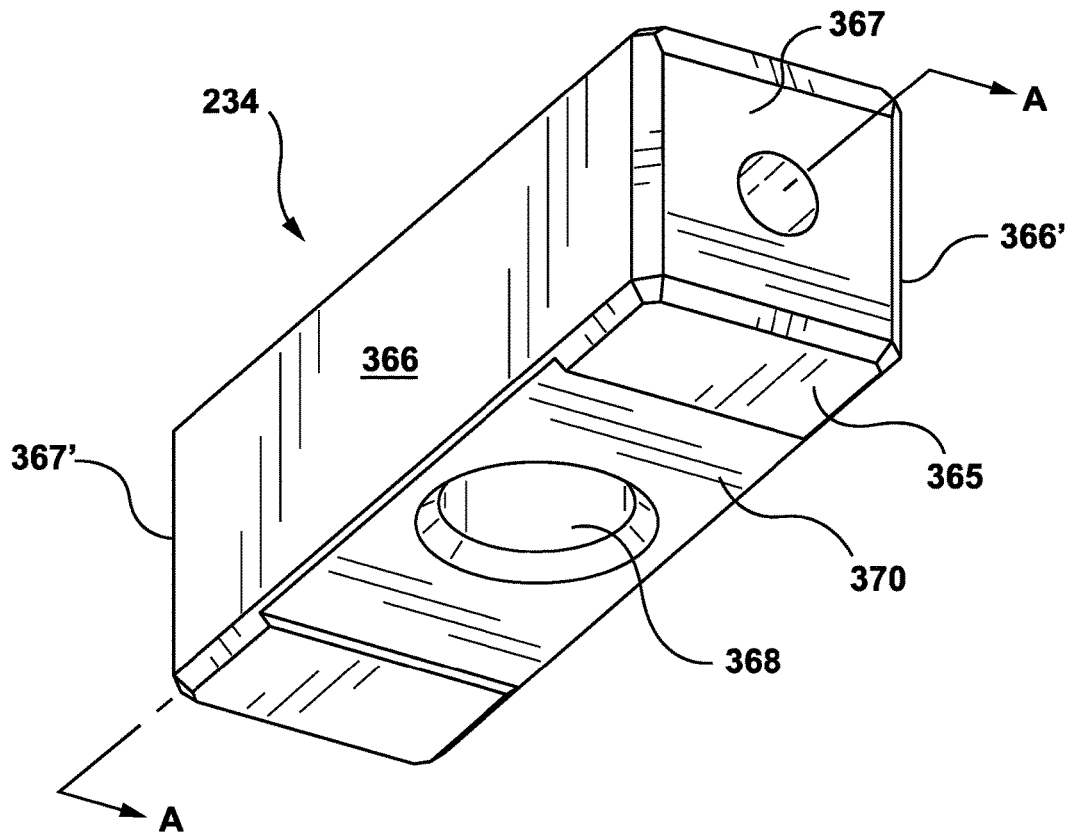
FIG. 3 is a bottom perspective view of the load component.
Figure 3A:
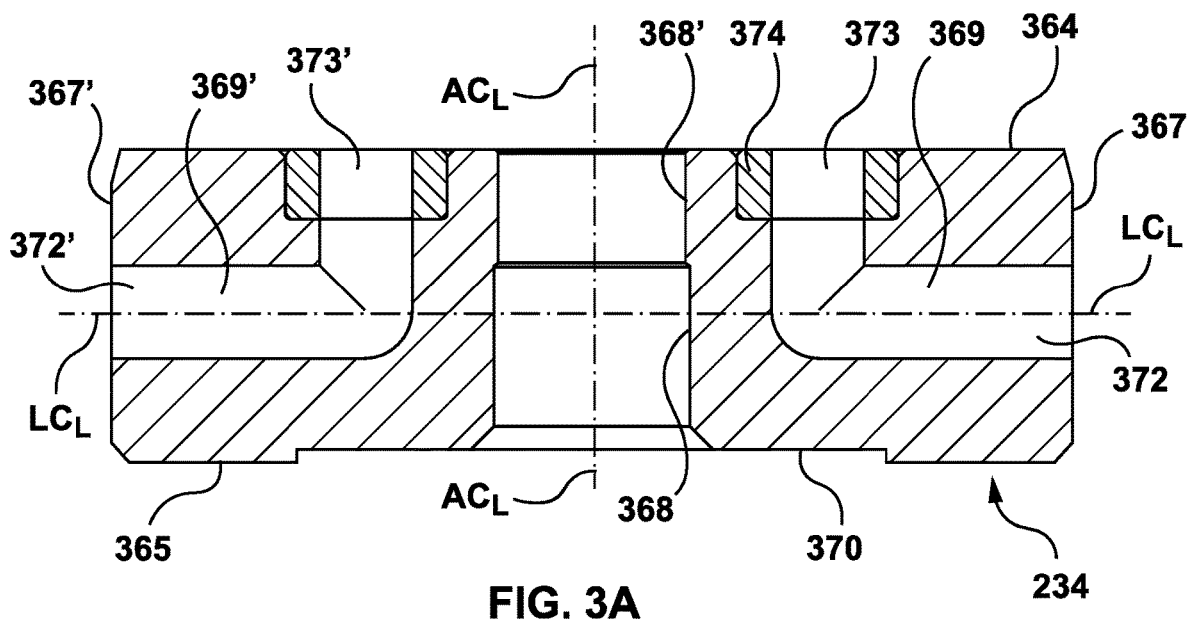
FIG. 3A is a sectional view of the load component taken along line A-A of FIG. 3.

Referring now to FIGS. 3 and 3A, in which FIG. 3 is a bottom perspective view of load component 234 disassembled from nozzle body 233, and FIG. 3A is a sectional view of load component 234 taken along line A-A of FIG. 3. A non-limiting example of load component 234 will now be described. Load component 234 includes a top 364, a bottom 365, sides 366, 366' and ends 367, 367'. In the current embodiment, load component 234 can generally be described as having a cuboid shape. A length of load component 234 is defined by the distance between its ends 367, 367', a width of load component 234 is defined by the distance between its sides 366, 366', and a thickness or height of load component 234 is defined by the distance between its top 364 and its bottom 365. A longitudinal center line $LC_L$ of load component 234 extends along its length through the midpoints of its width and its thickness, and an axial center line $AC_L$ of load component 234 extends across its thickness through the midpoints of its length and its width. When load component 234 is installed in slot 257, secured orientation of nozzle body 233 relative to insert holder 126 maintains parallel or substantially parallel alignment between ends 367, 367' of load component 234 and bearing surfaces 148 of a pair of cavity inserts 106 that are associated with load component 234.

Load component 234 includes a fastening bore 368 and a load component flow channel 369. Fastening bore 368 extends through load component 234 between its top and bottom sides 364, 365. Optionally, at least a portion of fastening bore 368 is threaded, shown at 368', to mate with a complementary threaded tool, such as a jack bolt to assist with extracting load component 234 from nozzle body 233. Fastener 262 extends through fastening bore 368 to releasably couple load component 234 to nozzle body 233 via threaded bore 261, as shown in FIGS. 1 and 1A. Depending on the cold condition fit between load component 234 and slot 257, and/or the cold condition fit between load component 234 and its associated side-gate tip assemblies, fastener 262, can be used to facilitate installation load component 234 into slot 257. As shown in FIG. 3, by way of example and not limitation, load component 234 includes a single fastening bore 368 extending therethrough at the mid points of its length and width; however, other fastening bore configurations are contemplated. For example, in an alternative embodiment (not shown) load component 234 can have two fastening bores 368, one on either side of load component longitudinal centerline $LC_L$, and spaced apart from its axial centerline $AC_L$, each of the two fasting bores 368 being aligned with a corresponding threaded bore 261 in slot 257.

As shown, load component 234 includes a seat 370 in its bottom 365. When load component 234 is coupled to nozzle body 233, a washer or retaining member 271 (shown in FIGS. 2, and 2B) is sandwiched between a head portion of fastener 262 and seat 370 to distribute the holding force of fastener 262 across load component 234. Retaining member 271 and seat 370 are optional features of side-gate nozzle assembly 101, either or both of which can be omitted if not needed in a molding application in which side-gate nozzle assembly 101 is used. Each load component 234 can have a discrete retaining member 271, as is shown in FIG. 2; however, in an alternative embodiment (not shown) retaining member 271 extends between or across two or more adjacent load components 234.

Load component flow channel 369 is in fluid communication with flow channel 112 in nozzle body 233. Load component flow channel 369 extends through load component 234 to load component outlets 372, 372' respectively ending at ends 367, 367' of load component 234. Depending on the configuration of nozzle body flow channel 112, load component flow channel 369 can be configured in a variety of ways. As shown in FIG. 3A, by way of example and not limitation, load component flow channel 369 includes two discrete load component flow channels 369, 369' each of which directs the stream of moldable material received through a respective load component inlet 373, 373' to a respective load component outlet 372, 372'. Also, as shown in FIG. 3A, load component inlet 373 is formed within an annular sealing member 374 seated in top 364 of load component. Annular sealing member 374 is optional and may be omitted if not required. Annular sealing member 374 is similar to the sealing component shown the applicants' U.S. Pat. No. 9,272,455 B2.

Figure 4:
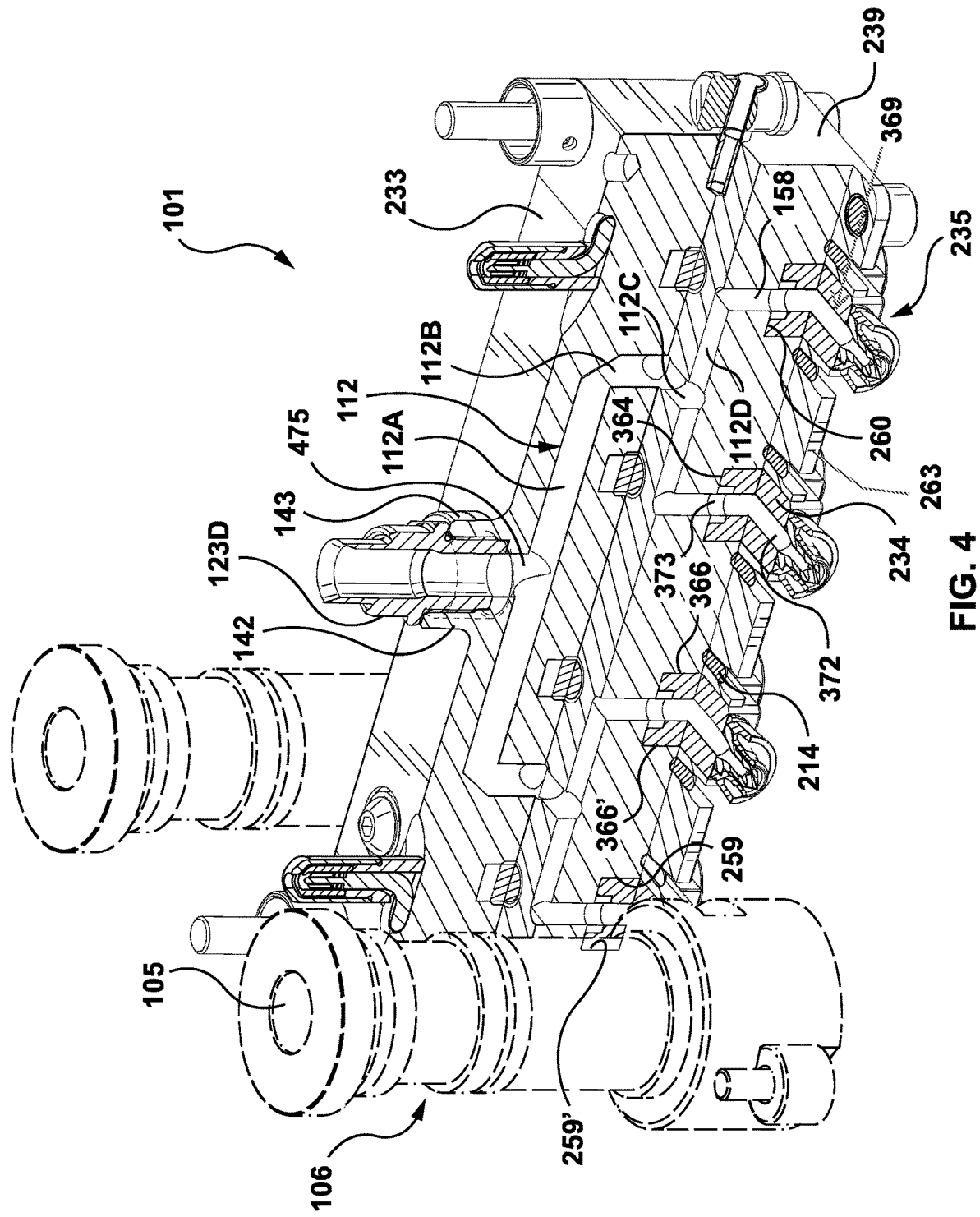
FIG. 4 is a perspective stepped sectional view of the side-gate nozzle assembly showing a flow channel extending therethrough and showing the position of two cavity inserts (shown in phantom) relative to the side-gate nozzle assembly as they would be when assembled the side-gate injection molding apparatus.

Referring to FIG. 4, which is a perspective stepped sectional view of side-gate nozzle assembly 101 showing a non-limiting example of flow channel 112 and showing the position of two cavity inserts 106 (shown in phantom) relative to side-gate nozzle assembly 101 as they would be when assembled in side-gate injection molding apparatus 100. Flow channel 112 extends through nozzle body 233 and can be referred to as nozzle body flow channel 112. Flow channel 112 begins at a nozzle body inlet 475 which, as shown by example, in in FIG. 4 extends through nozzle body locator 142. Flow channel 112 includes a network of channel portions which divide an incoming stream of moldable material into a plurality of outgoing streams of moldable material.

Flow channel 112 includes a first channel portion 112A that extends longitudinally away from nozzle body inlet 475 towards distal side 239. First channel portion 112A ends at a second channel portion 112B which connects first channel portion 112A to a third channel portion 112C that extends widthwise within nozzle body 233 towards longitudinal sides 238, 238'. Third channel portion 112C ends at a fourth channel portion 112D, which extends longitudinally away from third channel portion 112C towards distal sides 239, 239'. Fourth channel portion 112D ends at nozzle body outlet 158 which connects fourth channel portion 112D to flow channel 369 in load component 234. More specifically, fourth channel portion 112D ends at respective nozzle body outlet 158 that connects fourth channel portion 112D to a respective load component inlet 373, 373' which is in fluid communication with a respective mold cavity 105 via side-gate tip assembly 235. According to this configuration nozzle body flow channel 112 is divided into pairs of nozzle body outlets 158 that end at a wall of slot 257, and the number of nozzle body outlets 158 is equal to the number of mold cavities that are fed molding material by side-gate nozzle assembly 101.

In an alternative embodiment (not shown), nozzle body flow channel 112 divides into a number of nozzle body outlets 158 which is half of the number of mold cavities that are fed molding material by side-gate nozzle assembly 101. In such a configuration the final divide of molding material can occur within the load component rather than in the nozzle body. A non-limiting example of such a load component is described below with regard to FIGS. 7-7C.

Continuing with FIG. 4 and referring to FIG. 2B, nozzle body heater 214 extends widthwise across each abutment 263, adjacent to respective side walls 259, 259' of slot 257. In the current embodiment in which nozzle body heater 214 is an element heater seated in groove 240 in nozzle body 233, groove 240 and heater 214 disposed therein, is shaped to extend widthwise across the downstream side of nozzle body 233, adjacent to respective side walls 259, 259' of slot 257. According to this arrangement each load component 234 is positioned between widthwise extending portions of heater element 214. In a non-limiting embodiment of nozzle body heater 214, such as shown in FIG. 4, groove 240 and heater 214 disposed therein extend widthwise across internal abutments 263 at two locations and extend widthwise across external abutments 263 at one location. According to this arrangement each side 366, 366' of load component 234 is parallel to a respective widthwise extending portion of heater element 214. In an alternative embodiment (not shown), nozzle body includes a plurality of widthwise extending cartridge heaters, and each load component 234 is positioned between a pair of widthwise extending cartridge heaters.

Regardless of the specific configuration of nozzle flow channel 112, load component 234 is seated within slot 257, between adjacent abutments 263 and is positioned such that load component inlet 373 receives molding material from nozzle body outlet 158. By way of example and not limitation, load component inlet 373 is formed in top 364 of load component 233 so as to align with nozzle body outlet 158, which ends at bottom wall 260 of slot 257. In this configuration, fastener 262 secures load component 234 in slot 257 and holds top 364 of load component 234 against bottom wall 260 of slot 257 to promote a fluid seal between nozzle body flow channel 112 and load component flow channel 369 at the interface between nozzle body outlet 158 and load component inlet. In an alternative embodiment, nozzle body flow channel 112 is configured to exit nozzle body 233 through a nozzle body outlet 158 that extends to a side wall 259, 259' of slot 257. In such a configuration load component 234 is configured such that load component inlet 373 is formed a side 366, 366' of load component so as to align with nozzle body outlet 158 in side wall 259, 259' of slot when load component 234 is installed in slot 257. In this configuration, a fluid seal between nozzle body flow channel 112 and load component flow channel 369 is created by, for example, an interference fit between load component 234 and slot 257.

The width of load component 234 is sized relative to the width of slot 257, i.e. the distance between side walls 259, 259', to facilitate manual installation and removal of load component 234 into and out of slot 257 when side-gate nozzle assembly 101 is in the cold condition, i.e., prior to raising the temperature of side-gate nozzle assembly 101 to the required processing temperature to make plastic parts. Manual installation as used herein includes the use of hand tools and the like.

As nozzle body 233 is heated to a suitable processing temperature, thermal energy from heater 114 is transferred from nozzle body to load component 234 due to load component 234 being seated within slot 257. With this arrangement, as the temperature of nozzle body 233 increases, so does the temperature of load component 234. Since nozzle body 233 is in contact with heater 214, and load component 234 is heated by way of contact with nozzle body 233, load component 234 can be described as indirectly heated by heater 214. In an alternative embodiment (not shown) load component includes a heater. As nozzle body 233 is heated to a suitable processing temperature, the length of nozzle body 233 increases. This elongation of nozzle body 233 increases the pitch spacing between slots 257 and increases width of each slot 257. Since heat input into nozzle body 233 also heats load component 234, and as nozzle body 233 is heated, the width of load component 234 also increases.

In an embodiment of side gate nozzle assembly 101, load component 234 is made from a material having the same or similar coefficient of thermal expansion as the material from which nozzle body 233 is made. As nozzle body 233 is heated, the width of load component 234 relative to the width of slot 257 remains constant or generally constant. In such cases, the width of load component 234 can be sized to contact walls 259, 259' of slot 257 prior to heating nozzle body 233. Alternatively, the width of load component 234 can be sized relative to the width of slot 257 is sized to create a gap therebetween that is small enough to permit sufficient heat transfer from nozzle body 233 to load component 234. An example of such a gap is within a range of between 0.002 mm and 0.005 mm per side of load component 234.

In another embodiment of side gate nozzle assembly 101, load component 234 is made from a material which has a greater coefficient of thermal expansion than the material from which nozzle body 233 is made. In one configuration of this embodiment the width of load component 234 is sized relative to width of slot 257 such that when side-gate nozzle assembly 101 is heated to an operating temperature, sides 366, 366' of load component 234 contact side walls 259, 259' of slot 257. In another configuration of this embodiment the width of load component 234 is sized relative to width of slot 257 such that when side-gate nozzle assembly 101 is heated to an operating temperature there is an interference fit between nozzle body 233 and load component 234.

Contact between sides 366, 366' of load component and side walls 259, 259' of slot 257 increases the surface area contact between nozzle body 233 and load component 234, which improves heat transfer from nozzle body 233 to load component 234. With greater heat input into load component 234 from nozzle body 233, the thermal profile of load component 234 is improved, and there is also more thermal input available for side-gate tip assembly 235, which is indirectly heated by nozzle body 233 via load component 234, thus improving the overall thermal profile of side-gate nozzle assembly 101. Since load component 234 is indirectly heated by heater 214, load component 234 is made from a material having a thermal conductivity that is equal to or greater than the thermal conductivity of the material from which nozzle body 233 is made. This configuration promotes heat transfer from load component 243 to side-gate tip assembly 235.

In an embodiment of side-gate nozzle assembly 101, when load component 234 is installed in slot 257, at least a portion of load component outlet 372 is recessed below downstream side 237 of nozzle body 233. Such an embodiment is shown in FIG. 4 in which load component outlet 372 is parallel with a widthwise extending portion of heater 214, which allows greater heat input to the stream of moldable material as it passes through load component 234 and is injected into mold cavity 105.

In embodiments in which there is an interference fit between load component 234 and nozzle body 233 at operating temperature a gripping force is created between adjacent abutments 263 and load component 234, along at least a portion of the length of load component 234. This gripping force assists with holding load component 234 in place against injection force and reduces the likelihood leaking moldable material between nozzle body outlet 158 and load component inlet 373 which can allow side-gate nozzle assembly 101 to be used in applications requiring higher injection pressures than might be possible if load component 234 were held to nozzle body 233 by fastener 262 alone.

In a non-limiting embodiment, the depth of slot 257 relative to the height of load component 234 is such that when load component 234 is installed in slot 257, at least 25% of the height load component 234 is received within slot 257, which, depending on the specific molding application in which side-gate nozzle assembly is used, creates sufficient gripping strength upon load component 234 to increase the injection pressure that side-gate nozzle assembly 101 can withstand. Gripping force created by interference between load component 234 and nozzle body 233 increases as a greater percentage of the height of load component 234 is received within slot 257. In an embodiment of side-gate nozzle assembly 101, between 50% and 75% of the height load component 234 is received within slot 257 to achieve sufficient gripping force upon load component 234. In another embodiment of side-gate nozzle assembly 101 at least 90% of the height load component 234 is received within slot 257 to achieve sufficient gripping force upon load component 234.

Figure 5:
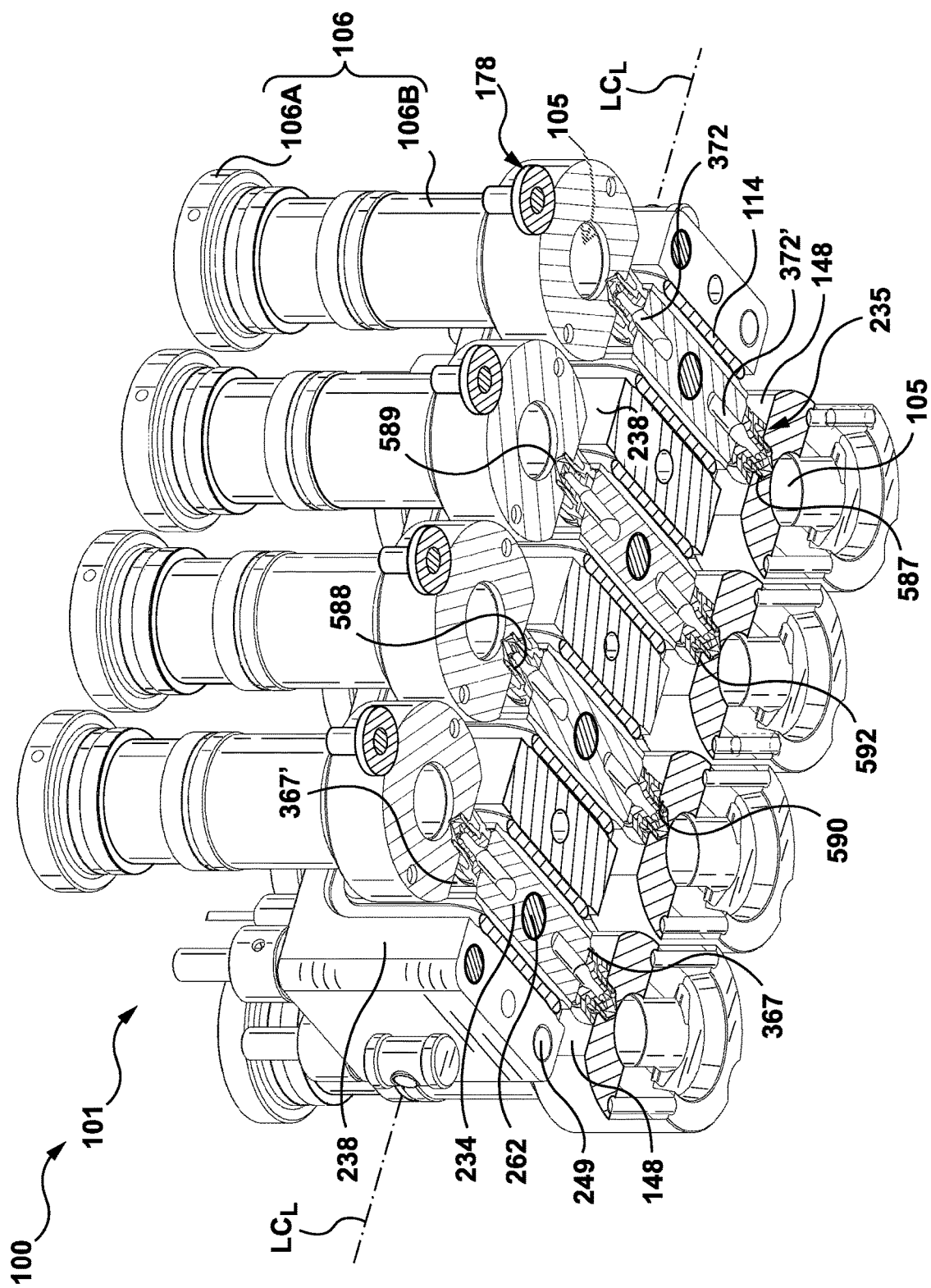
FIG. 5 is the bottom perspective stepped sectional view of the side-gate nozzle assembly and showing the position of eight cavity inserts relative to the side-gate nozzle assembly as they would be when assembled in the side-gate injection molding apparatus.

Referring to FIG. 1 and referring to FIG. 5 which is a bottom perspective stepped sectional view of side-gate nozzle assembly 101 of FIG. 2, also showing the position of eight cavity inserts 106 relative to side-gate nozzle assembly 101 as they would be when assembled in side-gate injection molding apparatus 100. Side-gate nozzle assembly 101 delivers molding material to eight cavity inserts 106 that are arranged in a two by four rectangular array; four cavity inserts 106 are positioned beside and evenly spaced apart along the length of each longitudinal side 238, 238' of nozzle body 233. With this configuration, side-gate nozzle assembly 101 can be described as delivering molding material to pairs of cavity inserts 106 that are spaced apart from nozzle body 233 on opposite sides of the longitudinal centerline $LC_L$ of side-gate nozzle assembly 101. One of the pair of cavity inserts 106 is spaced apart from nozzle body 233 on one side of the longitudinal centerline $LC_L$ of side-gate nozzle assembly 101 (in front of longitudinal centerline $LC_L$ as shown in the page view of FIG. 5). The other of the pair of cavity inserts 106 is spaced apart from nozzle body 233 on the opposite side of the longitudinal centerline $LC_L$ of side-gate nozzle assembly 101 (behind longitudinal centerline $LC_L$ as shown in the page view of FIG. 5).

Referring to FIG. 1, insert holder 126 includes a plurality of bores 177, which are arranged in a linear array and extend through insert holder 126. Each bore 177 is sized to receive a respective cavity insert 106. Cavity insert 106 includes first and second insert portions 106A, 106B. First insert portion 106A is installed into bore 177 through an upstream side of cavity insert holder 126, and second insert portion 106B is installed into bore 177 through a downstream side of insert holder 126. Cover plate 127 mates with insert holder 126 and is fastened thereto, such that cavity inserts 106 are sandwiched between intermediate plate 115B and cover plate 127. The configuration of cavity insert 106 as having first and second insert portions 106A, 106B, and the method of installing and retaining cavity insert 106 into insert holder 126 is shown by way of example and not limitation. Side-gate nozzle assembly 101 is compatible with side-gate injection molding apparatus' having various cavity insert configurations, including those having more than or fewer than two insert portions, and those in which cavity insert 106 is installed into insert holder 126 through an upstream side thereof and those in which cavity insert 106 is installed into insert holder 126 through a downstream side thereof.

The angular orientation of cavity insert 106 is secured within side-gate injection molding apparatus 100 so as to align bearing surface 148 with a respective end 367, 367' of load component 234. One way of achieving this is shown by way of example and not limitation in FIG. 1 at 178 in which a fastener is received in insert holder 126 and engages with a scallop in cavity insert 106 at a position which aligns bearing surface 148 with a respective end 367, 367' of load component 234.

Figure 5A:
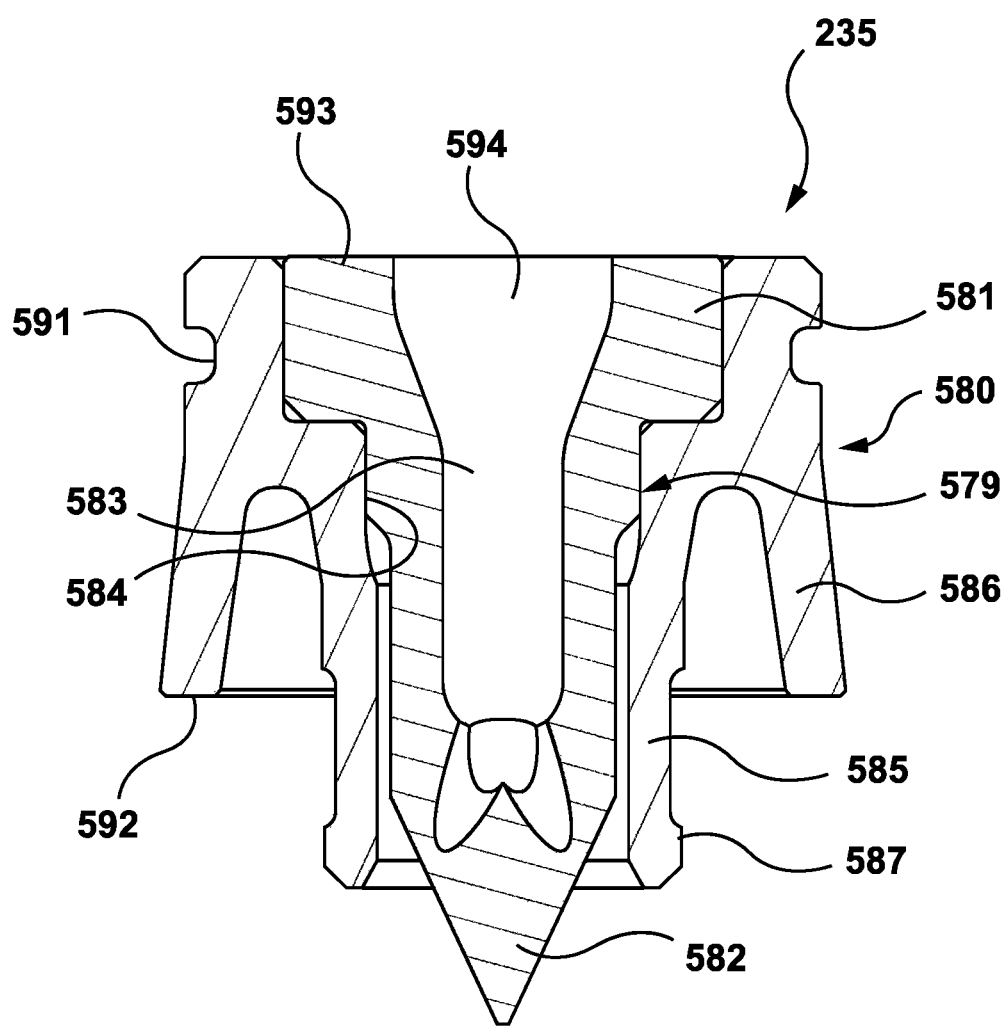
FIG. 5A is a sectional view of a tip assembly removed from a remainder of the side-gate nozzle assembly of FIG. 5.

Continuing with FIG. 5 and referring to FIG. 5A which is a sectional view of side-gate tip assembly 235. Side gate tip assembly 235 is adjacent to a respective end 367, 367' of load component 234. In operation, side-gate tip assembly 235 delivers moldable material, received from load component 234, to mold cavity 105. Side-gate tip assembly 235 is sized such that when load component 234 is removed from slot 257, side-gate tip assembly 235 can be retracted from cavity insert 106 into slot 257.

Thermal expansion of load component 234 along its length causes ends 367, 367' of load component 234 to press a pair of oppositely facing tip assemblies 235 towards a pair of cavity inserts 106 in which the pair of side-gate tip assemblies 235 are received. This pressing force creates a fluid seal between load component 234 and its associated pair of side-gate tip assemblies 235.

Side-gate tip assembly 235 includes a tip member 579 and a transfer seal or seal member 580. Tip member 579 includes a base 581 and a tapered end portion 582. A flow channel 583 extends through tip member 579 which is in fluid communication between load component flow channel 369 and mold cavity 105. Tip member 579 is received within a correspondingly sized bore 584 that extends through seal member 580 such that the two pieces are substantially coaxial Sealing member 580 includes a circumferential seal surface 587 that mates with an inner circumferential sealing surface 588 of cavity insert 106 to create a fluid seal between side-gate tip assembly 235 and cavity insert 106 and align tapered end portion 582 with a mold gate 589 in cavity insert, through which molding material flows into mold cavity 105. With reference to FIG. 5, inner circumferential sealing surface 588 is located within a counter bore 590 that leads to mold gate 589. Tip member 579 is made from a material that is more thermally conductive than the material from which seal member 580 is made. A non-limiting example of a suitable material for tip member 579 includes beryllium copper or other copper alloy. Accordingly, seal member 580 may be made from a material that is less thermally conductive than the material selected for tip member 579, a non-limiting example of a suitable material for seal member 580 includes H13 steel or titanium.

Side-gate tip assembly 235 can have a variety of configurations, and a non-limiting example of side gate tip assembly shown in FIG. 5A. Seal member 580 includes concentric inner and outer tubular portions 585, 586 that are joined together near a shoulder of bore 584. Outer tubular portion 586 tapers radially outward in the downstream direction. The degree of the taper can be selected to allow outer tubular portion 586 to deflect as side-gate nozzle assembly 101 is heated and load component presses side-gate tip assembly 235 against bearing surface 148 of cavity insert 106 to reduce the likelihood of damage, for example, hobbing between load component 234 and side-gate tip assembly 235. In an alternative embodiment (not shown) outer tubular portion 586 is straight rather than tapered, which can increase the sealing force between side-gate tip assembly 235 and load component 234 in comparison to the shown embodiment. In another alternative embodiment (not shown), tapered outer tubular portion 586 is a separate component such as a disc spring that is seated between bearing surface 148 and side gate tip assembly 235 to urge the tip assembly against load component 234 when nozzle body 233 is unheated.

Continuing with FIG. 5A, inner tubular portion 585 projects beyond outer tubular portion 586 and includes circumferential, seal surface 587 that contacts and seals against inner circumferential sealing surface 588 of cavity insert 106. To assist with extraction of side-gate tip assembly 235 from cavity insert 106, seal member 580 optionally includes a tool engaging feature, for example a groove or slot shown at 591 sized to mate with a suitably shaped tool, for example a spanner or other hand tool which can be used to remove side-gate tip assembly 235 from cavity insert 106.

Outer tubular portion 586 includes a support surface 592 that seats against bearing surface 148 of cavity insert 106 when side-gate nozzle assembly 101 is heated to a processing temperature and load component 234 presses side-gate tip assembly towards cavity insert 106. Bearing surface 148 is planar to mate with support surface 592, which is also planar, which creates a flat annular shaped interface therebetween, which can act as a secondary seal if molding material migrates beyond inner and outer circumferential sealing surfaces 587, 588. Outer tubular portion 586 can optionally include evenly spaced slots extending into outer tubular portion 586 from support surface 592 to create a segmented annular interface between support surface 592 and bearing surface 148. This arrangement can help to limit heat transfer from side-gate tip assembly 235 to cavity insert 106. In addition to supporting side-gate tip assembly 235 against cavity insert 106, contact between support surface 592 and bearing surface 148 helps to reduce axial tilting of side-gate tip assembly 235 relative to bearing surface 148 of cavity insert 106 as load component 234 is removed from nozzle body 233. Although, as shown in FIG. 5, support and bearing surfaces 592, 148 are shaped to create a flat interface therebetween; other correspondingly shaped support and bearing surfaces 592, 148 are contemplated, for example a conical, sloped support surface and a likewise conical sloped bearing surface 148.

Regarding the example tip assembly shown in FIG. 5A, heat input causes load component 234 to elongate expand along its length. Each end 367, 367' of load component 234 bears against the upstream end of a respective tip member 579 which presses an internal shoulder of tip member 579 to seat against the external shoulder of bore 584 in seal member 580, which presses support surface 592 against bearing surface 148 of cavity insert 106, thereby generating a sealing force between load component 234 and a respective pair of side-gate tip assemblies 235.

An upstream end of tip member 579 can project beyond an upstream surface of seal member 580. This configuration concentrates sealing forces between load component 234 an inlet end 593 of tip member 579 when side-gate nozzle assembly is heated to its operating temperature. In another embodiment, the upstream end of tip member 579 can be flush with the upstream end of seal member 580. This configuration can help to limit wear of tip member 579 as load component 234 slides against side-gate tip assembly 235 as nozzle body 233 is heated. Other than sealing engagement between the upstream end of tip member 579 and load component 234 when side-gate nozzle assembly is heated to a processing temperature, side-gate tip assembly 235 and load component 234 are not attached or secured to one another.

In an embodiment of side-gate injection molding apparatus 100, the length of side-gate tip assembly 235, between support surface 592 and inlet end 593 of tip member 579, relative to the distance between bearing surface 148 of cavity insert 106 and end 367 of its corresponding load component 234 is such that when side-gate nozzle assembly 101 is unheated, i.e. is in a 'cold condition', the distance between support surface 592 and inlet end 593 of tip member 579 is less than the distance between bearing surface 148 of cavity insert 106. According to this arrangement, when side-gate tip assembly 235 is installed in cavity insert 106 and side-gate nozzle assembly 101 is unheated, there is a gap between respective inlet ends 593 of side-gate tip assemblies 235 and respective ends 367, 367' of their corresponding load component 234. In other words, when side-gate nozzle assembly 101 is at room temperature and an aligned pair of side-gate tip assemblies 235 are received in their respective cavity inserts, the distance between the inlet ends 593 of the pair of side-gate tip assemblies 235 is greater than the distance between ends 367, 367' of load component 234. In this configuration there is no cold-condition 'preload' or end force between tip assemblies 235 and their respective load components 234.

In this configuration, as side-gate nozzle assembly 101 is heated, when nozzle body 233 thermally expands and moves load component 234 relative to side-gate tip assembly 235, there is initially little to no frictional drag between load component ends 367, 367' and inlet end 593 of tip member 579 until the length of load component 234 expands enough to eliminate the gap. Delaying sliding contact between ends 367, 367' and inlet end 593 of tip member until side-gate nozzle assembly 101 is at least partially heated to a desired processing temperature eliminates side loading of tip assemblies 235 until load component 234 grows into contact with tip assemblies 235. This configuration and reduces wear of load component ends 367, 367' and/or inlet end 593 of tip member in comparison to known "sliding interface" side-gate hot runner systems which promote a preload between their tip assemblies and their respective upstream flow component side surfaces.

The gap between load component ends 367, 367' and inlet end 593 of its associated tip members 579 when side-gate tip assembly 101 is in a cold condition, can help to facilitate installation and removal of load component 234 from between its corresponding side-gate tip assemblies 235. However, the size of the gap is small enough such that once side-gate nozzle assembly 101 is heated to a processing temperature there is sufficient heat expansion load between load components 234 and their respective side-gate tip assemblies 235 to create a sealing force therebetween. Depending on several factors, including, for example, the coefficient of thermal expansion of load component 234, the desired sealing force between load member 234 and its associated side-gate tip assemblies 235, and the processing temperature and/or the melt flow index (MFI) of the polymer required for the particular molding application, a suitable gap size is between 0.003 mm and 0.02 mm.

Given the gap described above, when side-gate nozzle assembly is in a cold condition, load component 234 can be longitudinally offset within slot 257, between the upstream ends of its corresponding pair side-gate tip assemblies 235, by an amount that is equal to the size of the gap. The diameter of fastening bore 368 in load component 234 is larger than the diameter of fastener 262 to permit this lateral offset. With this arrangement, load component 234 can be laterally offset relative to longitudinal centerline $LC_L$ of nozzle body 233 as it first presses against one side-gate tip assembly 235, before pressing against the other tip assembly 235 associated with load component 234. This configuration can help accommodate for size variations such as, for example, the distance between load surfaces 148 of cavity inserts 106 relative to the longitudinal centerline $LC_L$ of nozzle body 233 that might occur from, for example, manufacturing tolerance variations between cavity inserts 106. This configuration can also help to promote an equal sealing force between ends 367, 367' of load component 234 and inlet ends 593 of its associated side-gate tip assemblies 235 when side-gate nozzle assembly is heated to a processing temperature. In an alternative embodiment, however, load component 234 is located within the slot, for example, by a hollow dowel (not shown) received in both load component 234 and slot 257, at or proximate to longitudinal centerline $LC_L$ of nozzle body. This arrangement creates a reference point from which lengthwise heat expansion of load component 234 can be calculated or measured.

When side-gate nozzle assembly 101 is in a cold condition, i.e. is not heated, side-gate tip assembly 235 is axially aligned with mold gate 589. However, load component outlet 372 and a tip member inlet 594 in tip member 579 are concentrically misaligned, heightwise and lengthwise, by an amount that is expected to be recovered when side-gate nozzle assembly 101 heated to an operating temperature.

As side-gate nozzle assembly 101 is heated to an operating temperature, thermal expansion of nozzle body 233 across its length and height moves ends 367, 367' of load component 234, which is secured within slot 257, relative to inlet ends 593 of tip member 579, received in cavity inserts 106 by an amount which eliminates, or substantially reduces concentric misalignment between load component outlet 372 and tip member inlet 594 in tip member 579 once side-gate nozzle assembly is heated to a desired operating temperature. Accordingly when used in linearly arranged side-gate molding applications in accordance with embodiments hereof, the floating arrangement between melt inlets of side-gate tip assemblies and melt outlets of load components 234 of the side-gate nozzle assemblies permits thermal expansion of nozzle body 233 in both longitudinal and heightwise directions without damaging the side-gate tip assemblies 235 or adversely affecting alignment between the side-gate tip assemblies and their respective cavity inserts 106.

Although side-gate nozzle assembly 101 is described above as having a gap between load component ends 367, 367' and inlet ends 593 of tip members 579 when side-gate tip assembly 101 is in a cold condition, in some instances, for example molding applications require high injection pressure and a material having a relatively high melt flow index (MFI), such as, Linear low-density polyethylene (LL-DPE), it may be desirable to have contact between load component ends 367, 367' and inlet ends 593 of tip assemblies when side-gate tip assembly 101 is in a cold condition. Contact between tip assemblies 235 and load component 234 when side-gate tip assembly 101 is in cold condition might cause some frictional drag between load component ends 367, 367' and tip assemblies 235 as load component 234 begins to move as nozzle body 233 is heated; however, without a gap as described above, the seal between load component 234 and tip assemblies 235 may be improved as there is no gap to be accounted for before load component 234 bears against tip assemblies 235 to create a seal therebetween.

FIGS. 6A-FIG. 6E are perspective sequence views depicting disassembly of side-gate nozzle assembly 101 for removal of side-gate tip assembly 235 from its respective cavity insert 106 in accordance with an embodiment hereof. Also shown in FIGS. 6A-FIG. 6E is the position of two cavity inserts 106, shown in phantom, relative to side-gate nozzle assembly 101 as they would be when assembled in side-gate injection molding apparatus 100. Two cavity inserts 106 are shown for ease of illustration, as in operation a respective cavity insert 106 would be associated with each side-gate tip assembly 235.

Figure 6A:
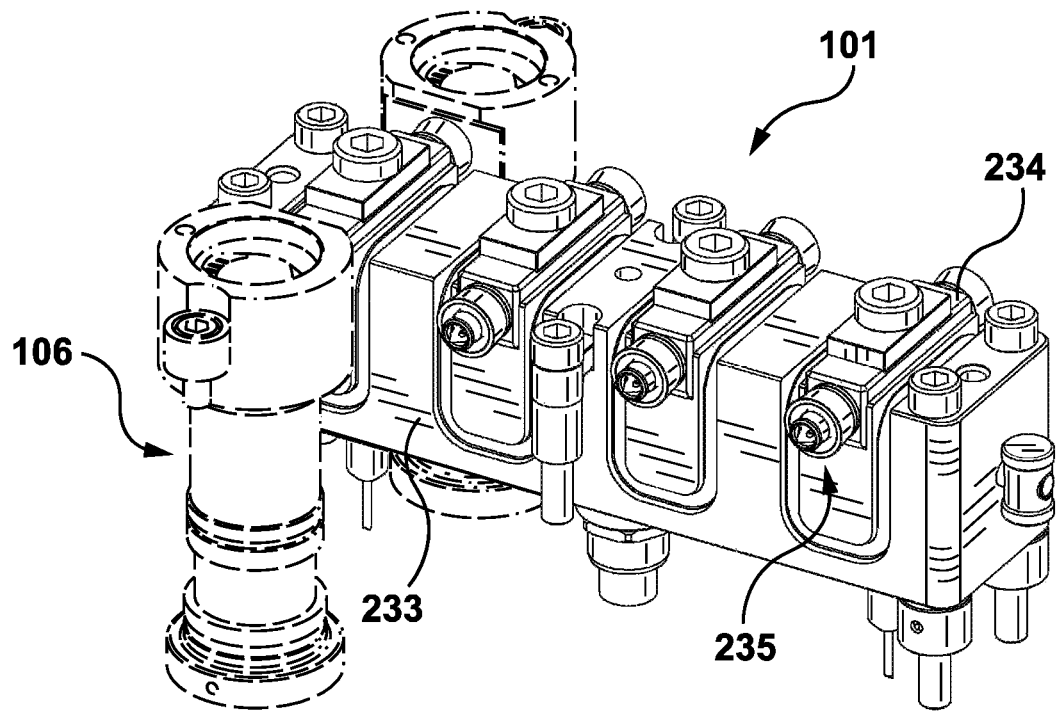
FIGS. 6A-FIG. 6E are perspective sequence views depicting disassembly of the side-gate nozzle assembly for removal of a side-gate tip assembly from its respective cavity insert in accordance with an embodiment hereof.

FIG. 6A depicts side-gate nozzle assembly 101 in a fully assembled configuration.

Figure 6B:
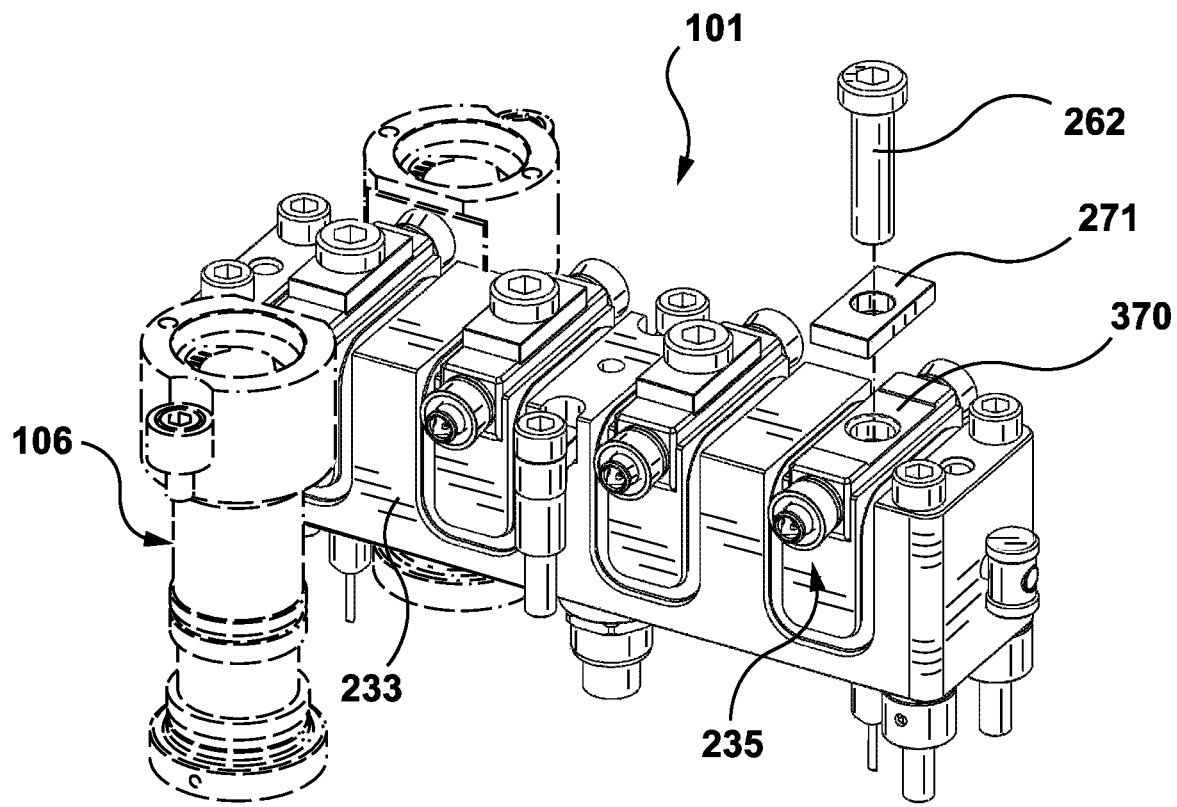

FIG. 6B depicts side-gate nozzle assembly 101 in a first disassembly configuration thereof. Fastener 262 is removed from fastener bore 261 (not visible in FIG. 6B, but visible in FIG. 6E) and washer 271 is removed from seat 370.

Figure 6C:
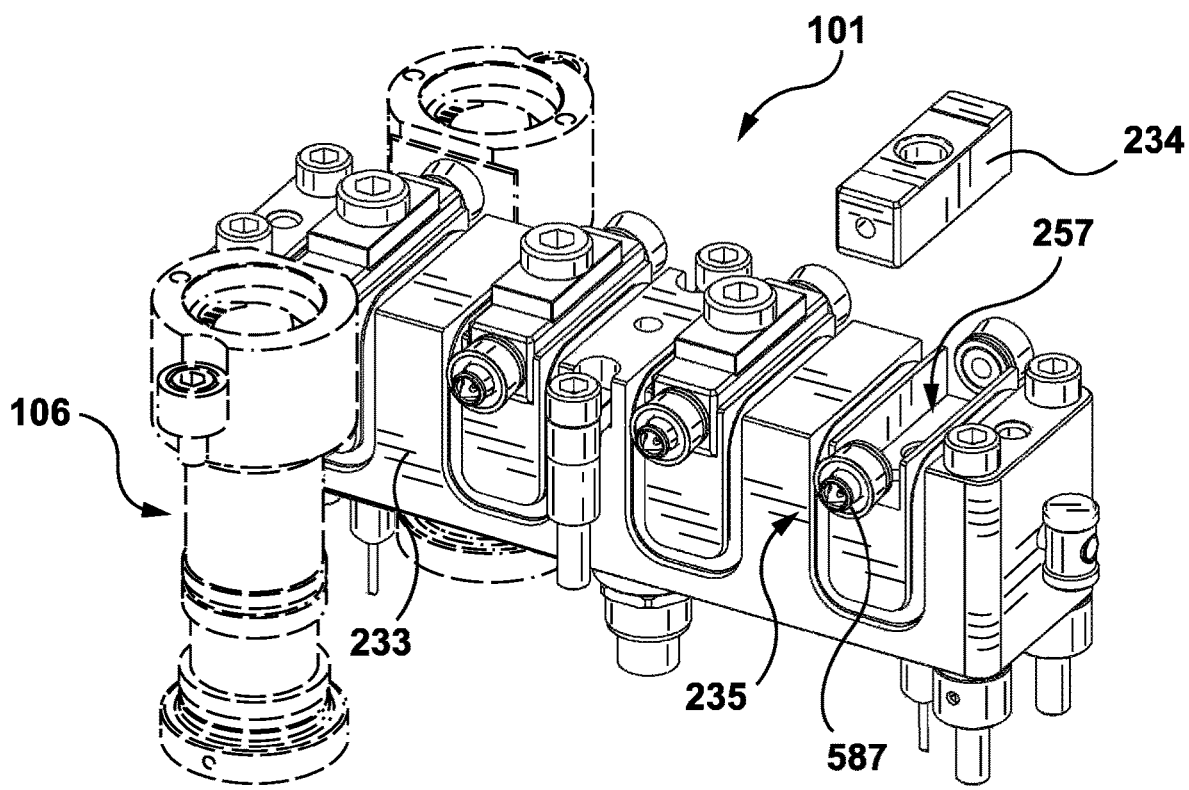

FIG. 6C depicts side-gate nozzle assembly 102 in a second disassembly configuration thereof. Load component 234 is extracted from slot 257. Side-gate tip assembly 235 is coupled or in position relative to its cavity insert 106. due to engagement therebetween, between outer and inner circumferential sealing surfaces 587, 588 of seal member 580 and cavity insert 106.

Figure 6D:
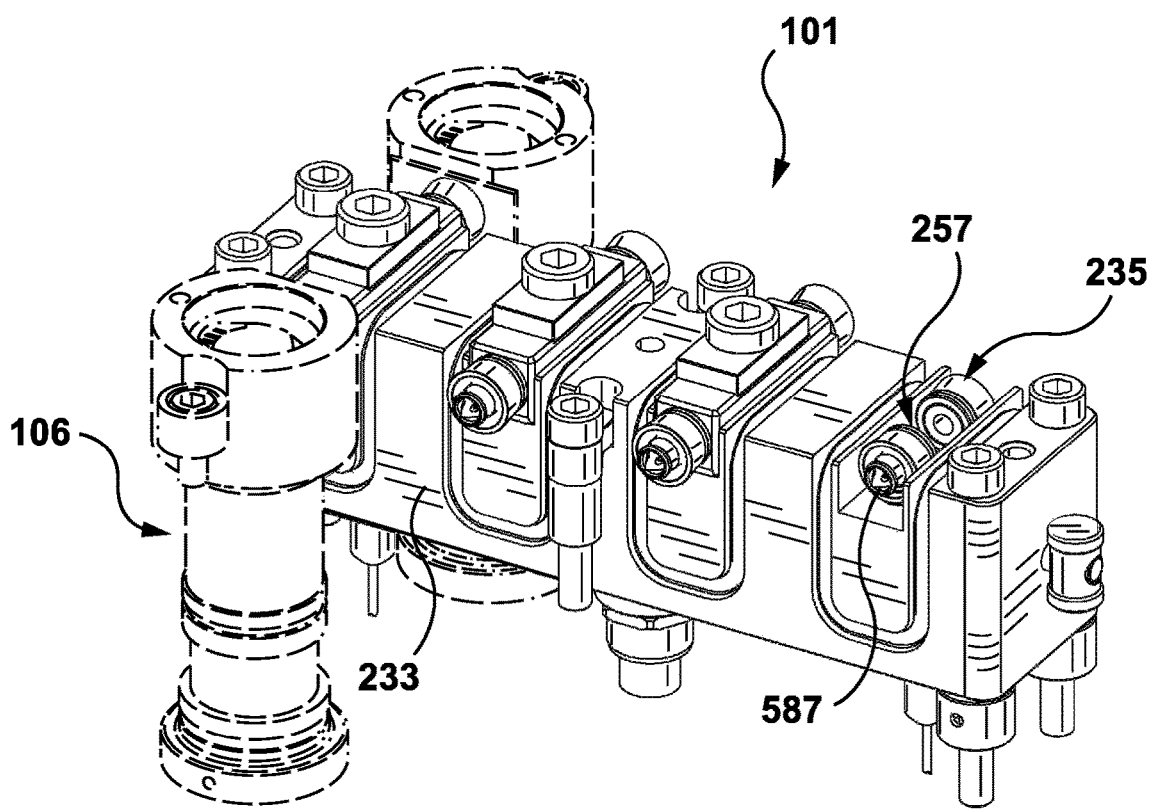

FIG. 6D depicts side-gate nozzle assembly 101 in a third disassembly configuration thereof. Side-gate tip assembly 235 is separated from its cavity insert 106 into slot 257 such that outer sealing surface 587 of transfer seal 580 has been withdrawn from inner circumferential sealing surface 588 in cavity insert 106.

Figure 6E:
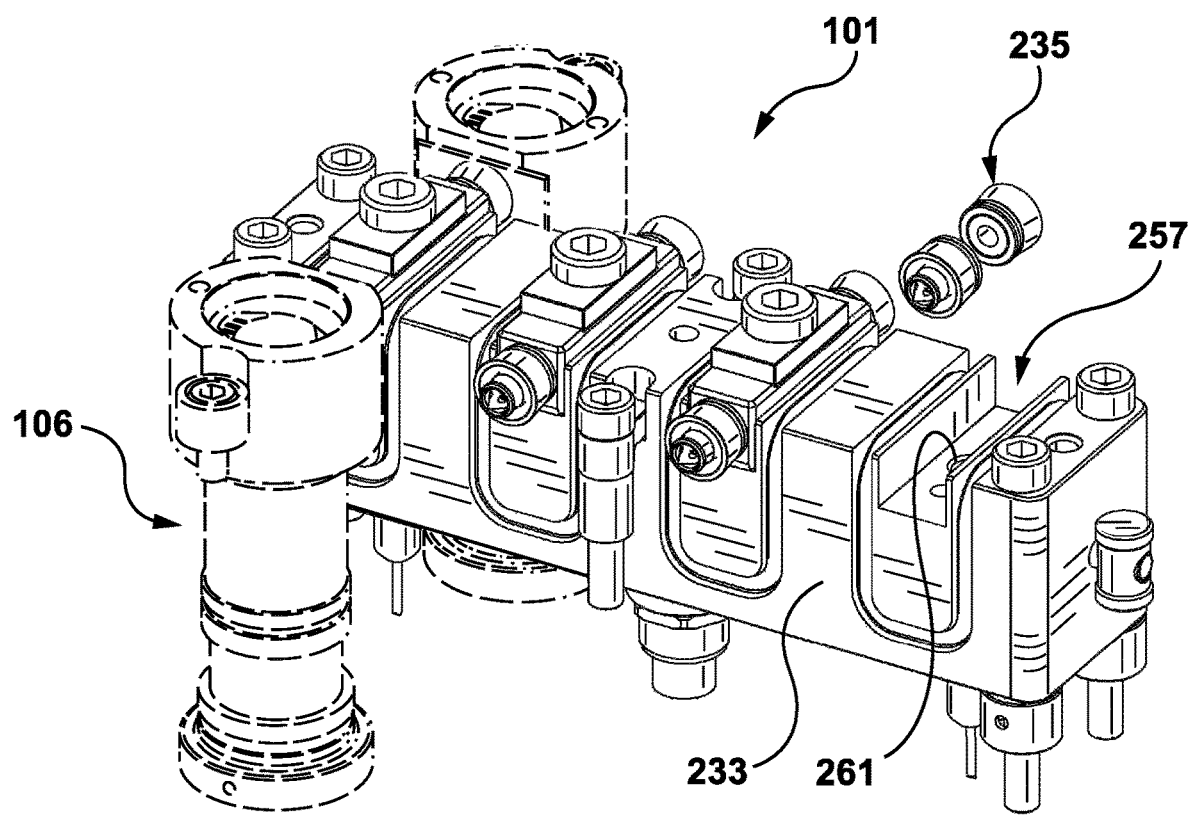

FIG. 6E depicts side-gate nozzle assembly 101 in a fourth disassembly configuration thereof. Side-gate tip assembly 235 has been removed from nozzle body 233. In this configuration, side-gate nozzle assembly 101 is now ready to receive a replacement tip assembly 235.

Reassembly of side-gate nozzle assembly 101 can be accomplished by performing the preceding steps in reverse order.

Although FIGS. 6A-6E depict a disassembly sequence in which both side-gate tip assemblies 235 associated with load component 234 are removed from their respective cavity inserts 106, based on the description above, it should be appreciated that the disassembly sequence could be per-formed with only one side-gate tip assembly 235 associated with load component 234 being removed from its cavity insert 106.

Figure 7:
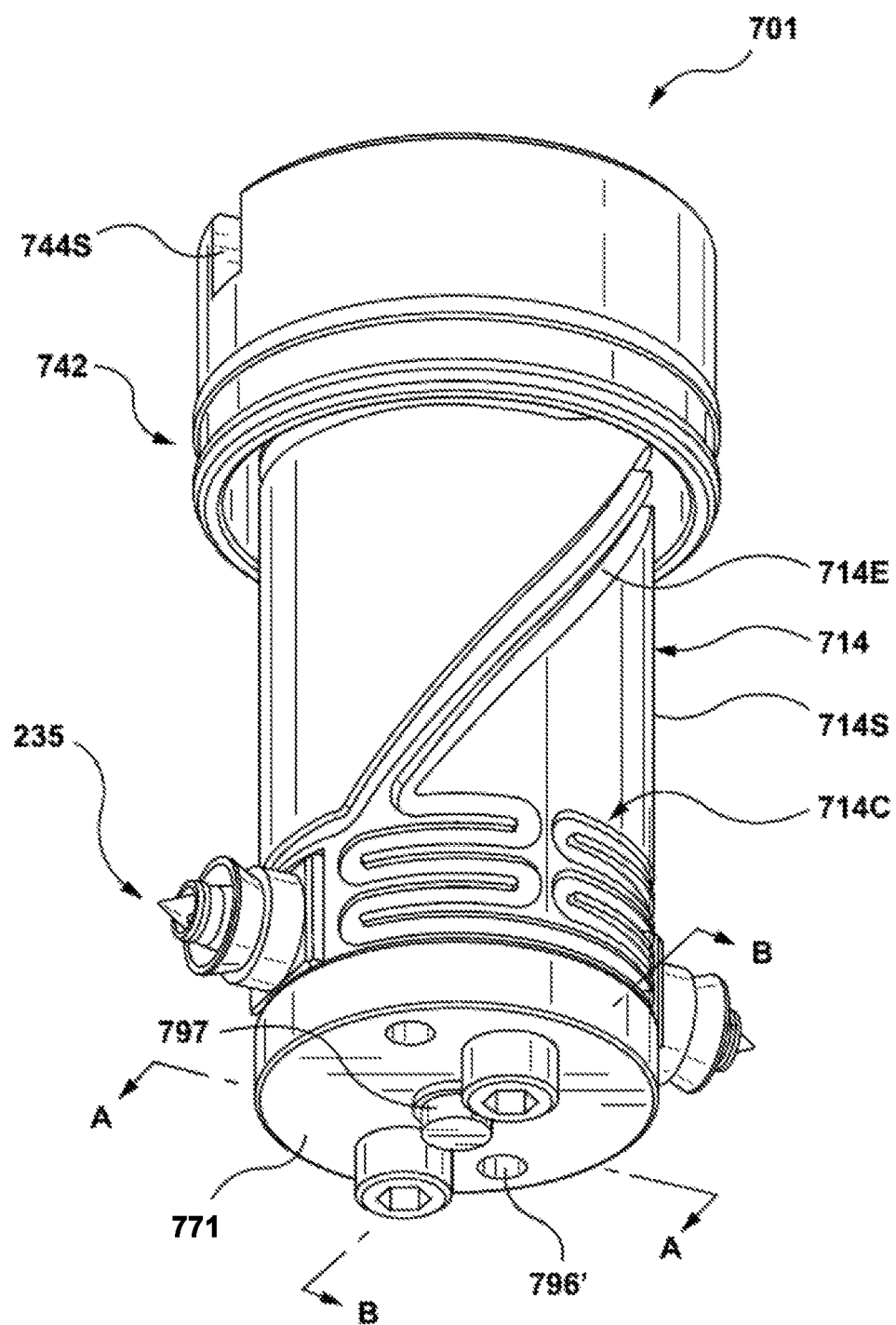
FIG. 7 is a perspective view of a side-gate nozzle assembly in accordance with another embodiment of the present disclosure.
Figure 7A:
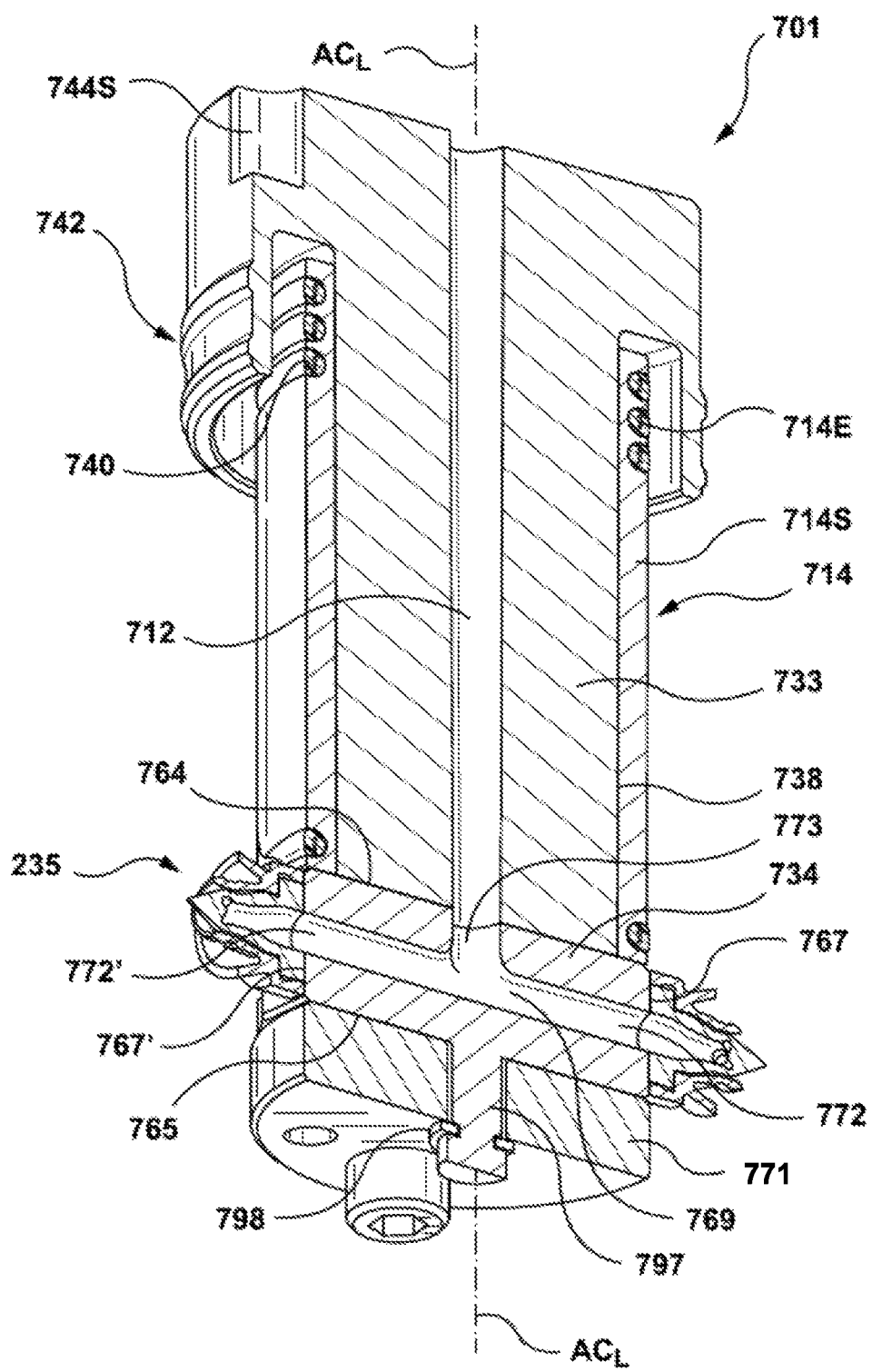
FIG. 7A is a perspective sectional view of the side-gate nozzle assembly of FIG. 7, taken along line A-A.
Figure 7B:
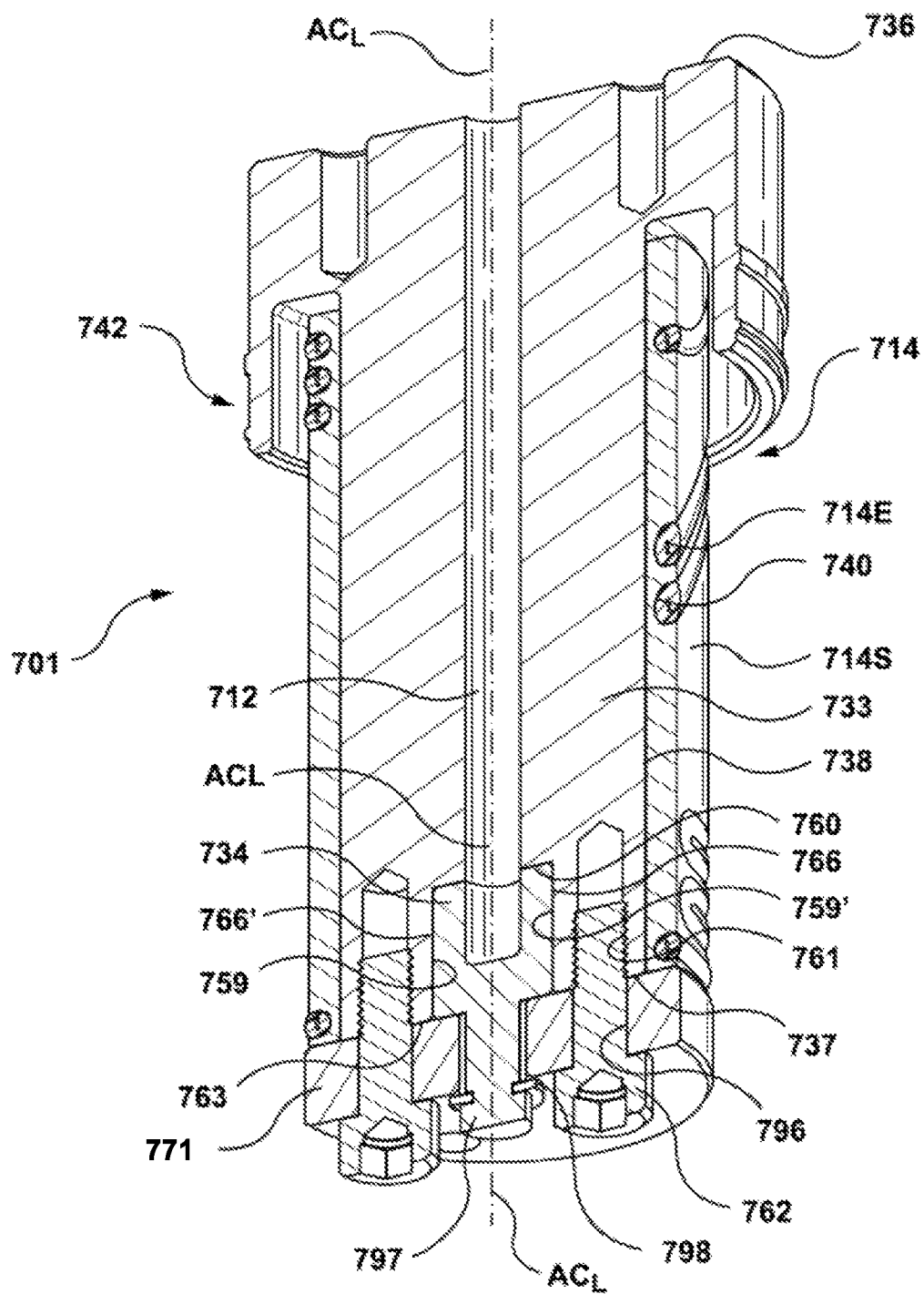
FIG. 7B is a perspective sectional view of the side-gate nozzle assembly of FIG. 7, taken along line B-B.
Figure 7C:
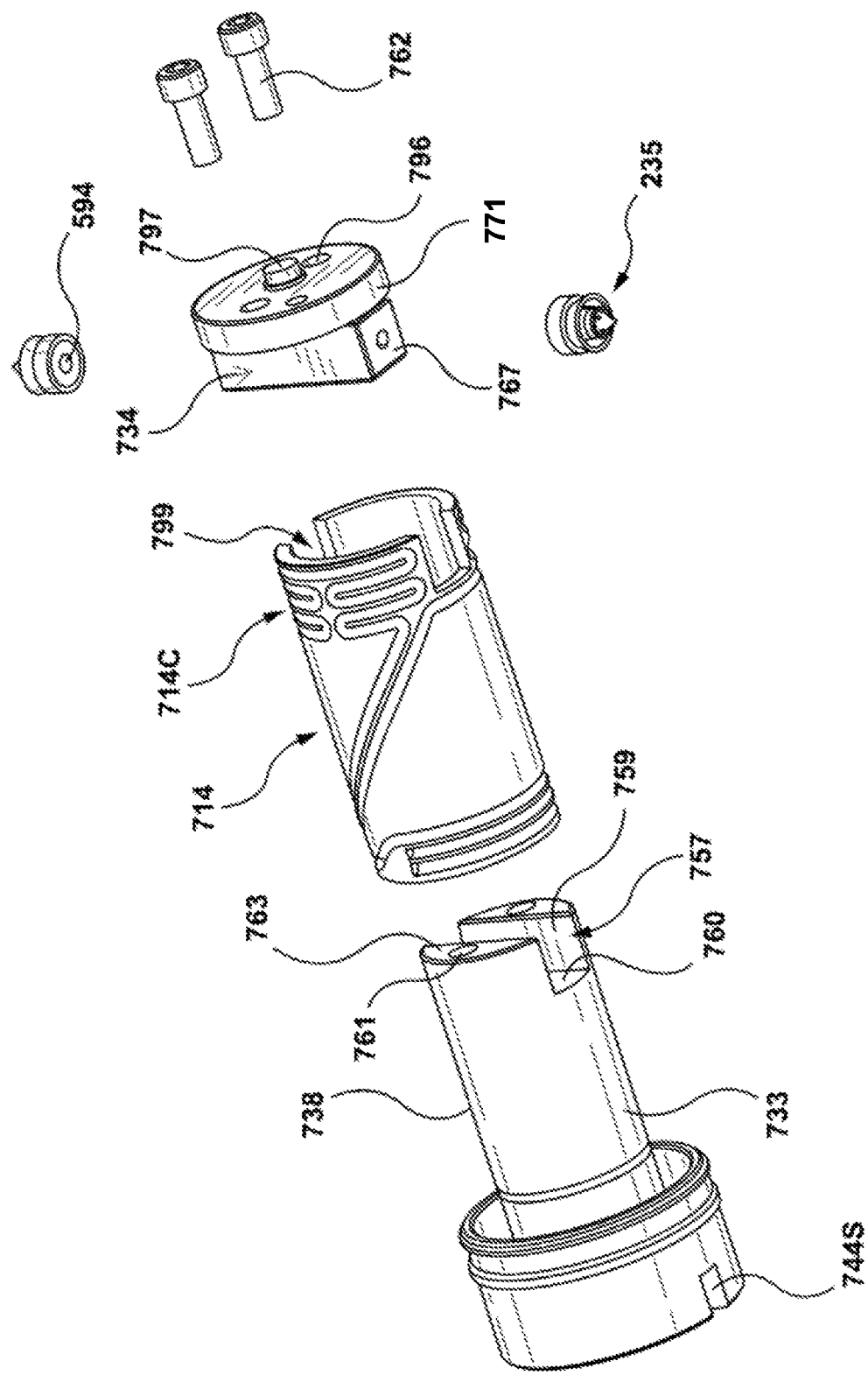
FIG. 7C is a partially exploded view of the side-gate nozzle assembly of FIG. 7.

FIG. 7 is a perspective view of a side-gate nozzle assembly 701 in accordance with another embodiment of the present disclosure; FIG. 7A is a perspective sectional view of side-gate nozzle assembly 701 taken along line A-A of FIG. 7; FIG. 7B is a perspective sectional view of side-gate nozzle assembly 701 taken along line B-B of FIG. 7; and FIG. 7C is an exploded view of side-gate nozzle assembly 701. Side-gate nozzle assembly 701 can be used in a side-gate injection molding apparatus that is similar to side-gate injection molding apparatus 100 shown in FIGS. 1 and 1A. Features and aspects of the present embodiment, including but not limited to features and aspects of slot 757, load component 734, and their associated side-gate tip assemblies 235 can be used correspondingly with the other embodiments disclosed herein and vice versa.

Referring to FIG. 7 and FIG. 7A, which is a perspective sectional view of side-gate nozzle assembly 701 taken along line A-A of FIG. 7, side-gate nozzle assembly 701 is in fluid communication between a source of molding material and a cavity insert (not shown) that is located beside side-gate nozzle assembly 701. Side-gate nozzle assembly 701 includes a nozzle body 733 having a flow channel 712 extending therethrough, a heater 714 for maintaining side-gate nozzle assembly 701 at a suitable processing temperature, a load component 734, a retaining member 771, and a side-gate tip assembly 235.

Referring to FIG. 7B, which is a perspective sectional view of side-gate nozzle assembly 701 taken along line B-B of FIG. 7, nozzle body 733 includes an upstream side 736 a downstream side 737, and a circumferential, longitudinal, side 738. Nozzle body 733 can be described as having a generally cylindrical shape. A length of nozzle body 733 is defined by the distance between its upstream and downstream sides 736, 737, and width of nozzle body 733 is defined by the distance across its circumferential side. An axial centerline $AC_L$ of side-gate nozzle assembly 701 extends along the length of nozzle body 733. By way of example and not limitation, flow channel 712 is coaxial with the axial centerline $AC_L$ of side-gate nozzle assembly 701.

At its upstream end, nozzle body 733 optionally includes an alignment feature 742 by which nozzle body 733 is located within a mold plate of a side-gate injection molding apparatus. As shown, alignment feature 742 is provided in the form of a collar that projects from an enlarged upstream end of nozzle body 733. The specific form and structure of alignment feature 742 is shown by way of example and not limitation as other forms and structures are contemplated for aligning nozzle body 733 within a side-gate injection molding apparatus.

Continuing with FIG. 7B and referring to FIG. 7C, which is a partially exploded view of side-gate nozzle assembly 701. At its downstream end, nozzle body 733 includes a slot 757 that extends across its width. Slot 757 is shaped to receive load component 734 therein. Although configurable in a variety of ways, as shown clearly in FIG. 7B, slot 757 includes three boundary walls: two side walls 759, 759', and a bottom wall 760 that extends between the two side walls 759, 759'. As shown clearly in FIG. 7C, slot 757 divides the downstream end of nozzle body 733 into two abutments 763. When side-gate nozzle assembly 701 is assembled, load component 734 is seated between abutments 763 and is secured to nozzle body 733 by retaining member 771. When nozzle body is installed in a side-gate injection molding apparatus, the angular orientation of slot 757 relative to its cavity inserts is established such that side-walls 759, 759' are perpendicular bearing surfaces of cavity inserts fed by side-gate nozzle assembly 701. One way of accomplishing this is by dowelled alignment between nozzle body 733 and the mold plate in which it is received; for example, a dowel (not shown) that extends outward from a dowel slot 744S in the upstream of nozzle body 733, which is parallel to side walls 759, 759', and is received in a corresponding slot in the mold plate in which nozzle body 733 is received. According to this configuration, when load component 734 is installed in slot 757, ends 767, 767' of load component 734, shown clearly in FIG. 7A, and the bearing surfaces of a pair of cavity inserts associated with load component 734 are aligned with each other.

Referring to FIGS. 7A and 7B, load component 734 includes a top 764, a bottom 765, sides 766, 766' and ends 767, 767'. In the current embodiment load component 734 includes a boss 797 which projects from its bottom 765. Boss 797 can be used to facilitate handling of load component 734. Excluding boss 797, the height of load component 734 is greater than the depth of slot 757. In this configuration when retaining member 771 is secured to nozzle body 733, load component 734 is sandwiched between retaining member 771 and nozzle body 733. To facilitate removal of load component 734 from nozzle body 733, retaining member 771 can be decoupled from nozzle body 733 and displaced away from slot 757.

As shown in FIG. 7B, by way of example and not limitation, retaining member 771 is secured to nozzle body 733 by fasteners 762 that extend through respective clearance bores 796 in retaining member 771 to engage with corresponding fastening bores 761 in the downstream end of nozzle body 733. With this configuration, upon removing fasteners 762 from nozzle body 733, retaining member 771 can be separated from nozzle body 733 and load component 734 can be extracted from slot 757, and one or both side-gate tip assemblies 235 that are associated with the removed load component 734 can be removed from its respective cavity insert in a manner such as described above with regard to FIGS. 6C-6E. Depending on the cold condition fit between load component 734 and slot 757, and/or the cold condition fit between load component 734 and its associated side-gate tip assemblies 235, fastener 762, can be used to facilitate installation load component 734 into slot 757.

Load component 734 and retaining member 771 can be coupled together, releasably or otherwise, to facilitate handling of retaining member 771 and load component 734 as an assembly. Although retaining member 771 and load component 734 can be coupled together in a variety of ways, one way is shown in FIGS. 7-7C, in which boss 797 extends through retaining member 771, and a securing member 798, for example a circlip, is coupled to boss 797 to prevent the two components 771, 734 from separating. With this coupling arrangement, retaining member 771 can rotate around boss 797, which allows clearance bores 796 in retaining member 771 to be rotated around boss 797 to align with fastening bores 761 in nozzle body 733 once load component 734 is received in slot 757. As shown in FIG. 7, retaining member 771 optionally includes a tool engageable feature, such as a threaded hole 796', for mating with a complementary threaded tool to assist with handling retaining member 771. Threaded hole 796' can be sized to mate with fastener 762 which, when removed from fastening bore 761, can be used to push against downstream side 737 of nozzle body 734 to separate retaining member 771 from nozzle body 733, thereby pulling load component 734 from slot 757.

As shown in FIG. 7A, a flow channel 769 extends through load component 734 from a single load component inlet 773. Flow channel 769 divides molding material received from nozzle body flow channel 712 between load component outlets 772, 772' located in respective ends 767, 767' of load component 734. Each load component outlet 772, 772 is in fluid communication with a mold cavity via a side-gate nozzle tip assembly 235.

In the current embodiment, heater 714 is a replaceable sleeve heater. Referring to FIG. 7B, heater includes a sleeve member 714S with a heater element 714E embedded therein. Sleeve member 714S can generally be described as having a tube or pipe shape and has an internal diameter that is sized to receive nozzle body 733 therein. A groove 740 is formed in an outer surface of sleeve member 714S in which heater element 714E is received. While configurable in a variety of ways, as shown in FIGS. 7 and 7C, groove 740 forms a tortuous route around and along sleeve member 714S that begins and ends at or near its upstream end.

Sleeve member 714S extends between head 742 and the downstream end of nozzle body 733. As shown clearly in FIG. 7C, at its downstream end, sleeve member 714S includes openings 799 that extend across its thickness. Openings can be described as interruptions or voids in the circumference of the downstream end of sleeve member 714S. When sleeve member 714S is properly installed on nozzle body 733 each opening 799 is aligned with a respective open end of slot 757. Openings 799 are shaped such that when load component 734 is seated in slot 757, a distal portion of sides and bottom 766, 766', 765 of load component 734 are surrounded by sleeve member 714S. In other words, the downstream end of sleeve member 714S extends past the bottom wall 760 of slot 757 and is notched or cut away in the area that would otherwise surround slot 757 so that sleeve member 714S does not adversely interfere with the longitudinal thermal expansion of load component 734 that creates sealing force between load component ends 767, 767' and their respective side-gate tip assemblies 235.

To remove heater 714 from nozzle body 733, both retaining member 771 and load component 734 are removed from nozzle body 33, then, heater 714 can be pulled from nozzle body 733 in the axial direction. In the present embodiment, the length of load component 734 is greater than the outer diameter of sleeve member 714S. In this configuration, heater 714 may be replaced without also having to remove side-gate tip assemblies 235 from their respective cavity inserts. In an alternative embodiment (not shown), the length of load component 734 is less than the outer diameter of sleeve member 714S. In this configuration, before heater 714 can be replaced, load component 734 is removed from nozzle body 733 and side-gate tip assemblies 235 are removed from their respective cavity inserts.

As shown clearly in FIGS. 7 and 7C, at the circumferential portions of sleeve member 714S that extend between openings 799, groove 740 and heater element 714E embedded therein includes a plurality of longitudinally spaced apart circumferential portions 714C that are connected together to increase the power density of heater 714 in the area of nozzle body 733 in which load component 734 is seated in comparison to the power density of heater 714 near longitudinal midpoint of nozzle body 733. This arrangement improves the heat input to load component 734. In an alternative embodiment (not shown) nozzle body 733 is heated by an element heater that is received in a groove in nozzle body 733 that is similar to groove 740 in sleeve member 714S.

Side-gate tip assemblies 235 are radially located within the cavity insert in which they are received. When side-gate nozzle assembly 701 is unheated, load component outlets 772, 772' and tip member inlets 594 in tip assemblies 235 are concentrically misaligned by an amount that is expected to be recovered when side-gate nozzle assembly 701 heated to an operating temperature.

As side-gate nozzle assembly 701 is heated to an operating temperature, thermal expansion of nozzle body 733 moves ends 767, 767' and load component outlets 772, 772' relative to inlet apertures in tip assemblies 235 associated with load component 734 by an amount which eliminates, or substantially reduces concentric misalignment between load component outlets 772, 772' and the inlet apertures in tip assemblies 235 once side-gate nozzle assembly 701 is heated to a desired operating temperature.

Thermal expansion of load component 734 along its length causes ends 767, 767' of load component 734 to press a pair of oppositely facing tip assemblies 235 towards a pair of cavity inserts in which the pair of side-gate tip assemblies 235 are received. This pressing force creates a fluid seal between load component 734 and its associated pair of side-gate tip assemblies 235.

As shown herein, load component 734 and slot 757 in which load component 734 is received both have sides (sides 766, 766' of load component 734, and sidewalls 759, 759' of slot 757), and another wall that extends between and is perpendicular to its side walls (top 764 of load component 734 and bottom wall 760 of slot 754). However, other complementary shapes for load component 734 and slot 757 in which load component 734 is seated are contemplated which also permit load component 734 to be installed into and removed from slot 754 without having to remove nozzle body 733 and/or a cavity insert from the respective their mold plate(s). A non-limiting example of an alternative shape for load component 734 and a slot 757 include a load component 734 having an isosceles trapezoidal cross-section when viewed from its ends 767, 767', and a slot 757 in nozzle body 733 which has a complementary isosceles trapezoidal cross-section. In such an embodiment, to facilitate insertion and removal of the trapezoidal load component 734 from its correspondingly shaped slot 757, bottom 765 of the trapezoidal load component is wider than its top 764, and the side walls 759, 759' of the trapezoidal slot extend away from each other towards the downstream surface 763 of nozzle body 733 at the angle as the sides 766, 766' of trapezoidal load component converge towards each other in the upstream direction. Further, such a trapezoidal load component and trapezoidal slot are also sized such that when trapezoidal load component 734 is secured in the trapezoidal slot 757 a seal is created between the wall of trapezoidal load component 734 and slot 757 in which load component inlet 773 and nozzle channel outlet are formed.

While various embodiments have been described above, they have been presented only as illustrations and examples, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other embodiment.

What is claimed is:

1. A side-gate nozzle assembly for delivering a stream of moldable material to a cavity insert located beside the side-gate nozzle assembly, the side-gate nozzle assembly comprising:
   a nozzle body having
      a nozzle body flow channel extending through the nozzle body,
      a heater coupled to the nozzle body, and
      a slot extending across a width of a downstream side of the nozzle body, the slot being open-ended and including a pair of side walls and a bottom wall that extends between the pair of side walls, and the nozzle body flow channel having a nozzle body outlet that ends at one the side and bottom walls of the slot;
   a load component received in the slot, the load component having a first end, a second end, first and second longitudinal sides extending between the first end and the second end, and a load component flow channel in fluid communication between the nozzle body outlet and a load component outlet, the load component outlet being disposed within at least one of the first end and the second end of the load component; and
   a side-gate tip assembly adjacent to the load component outlet of the load component and in fluid communication between the load component flow channel and the cavity insert, the side-gate tip assembly including a support surface perpendicular to the pair of side walls of the slot,
   wherein in operation lengthwise thermal expansion of the load component causes the at least one of the first end and the second end of the load component in which the load component outlet is located to press the support surface of the side-gate tip assembly against a bearing surface of the cavity insert.

2. The side-gate nozzle assembly of claim 1, wherein the load component is made from a material that has a greater coefficient of thermal expansion than the material from which the nozzle body is made.

3. The side-gate nozzle assembly of claim 2, wherein a width of the load component is sized relative to a width of the slot such that when the side-gate nozzle assembly is heated to an operating temperature there is an interference fit between the load component and the nozzle body.

4. The side-gate nozzle assembly of claim 1, wherein the load component is made from a material having a thermal conductivity that is equal to or greater than a thermal conductivity of a material from which the nozzle body is made.

5. The side-gate nozzle assembly of claim 4, wherein the load component is without a heater and is indirectly heated by the nozzle body.

6. The side-gate nozzle assembly of claim 1, wherein the bottom wall is perpendicular to the pair of side walls and the load component is cuboid shaped.

7. The side-gate nozzle assembly of claim 1, wherein the nozzle body outlet ends at the bottom wall of the slot.

8. The side-gate nozzle assembly of claim 1, wherein at least 25% of a height of the load component is received within the slot.

9. The side-gate nozzle assembly of claim 1, wherein the nozzle body includes a groove in which a heater element is received.

10. The side-gate nozzle assembly of claim 9, wherein the load component is positioned between portions of the heater element that extend across the width of the downstream side of the nozzle body.

11. The side-gate nozzle assembly of claim 10, wherein a first portion of the portions of the heater element that extend across the width of the downstream side of the nozzle body is parallel to the first longitudinal side of the load component, and a second portion of the portions of the heater element that extend across the width of the downstream side of the nozzle body is parallel to the second longitudinal side of the load component.

12. The side-gate nozzle assembly of claim 1, wherein at least a portion of the load component outlet is recessed below the downstream side of the nozzle body.

13. The side-gate nozzle assembly of claim 1, wherein the nozzle body outlet of the nozzle body flow channel includes two nozzle body outlets that end at the bottom wall of the slot.

14. The side-gate nozzle assembly of claim 13, wherein the load component flow channel includes two discrete load component flow channels, each of which extends between a respective nozzle body outlet and a respective load component outlet at one of the first end and the second end of the load component.

15. The side-gate nozzle assembly of claim 1, wherein the nozzle body is cuboid shaped and includes a plurality of open-ended slots, each slot extending across the width of the downstream side of the nozzle body and having a respective load component received therein.

16. The side-gate nozzle assembly of claim 1, wherein a width of the load component as measured between the first and second longitudinal sides of the load component is sized such that in operation the first and second longitudinal sides of the load component contact the pair of side walls of the slot.

17. A side-gate injection molding apparatus comprising:
   a pair of cavity inserts received in a mold plate, each cavity insert defining at least a portion of a mold cavity;
   a side-gate nozzle assembly positioned between the pair of the cavity inserts, the side-gate nozzle assembly including
      a nozzle body having
         a nozzle body flow channel extending through the nozzle body,
         a heater coupled to the nozzle body,
         a slot extending across a width of a downstream side of the nozzle body, the slot being open-ended and including a pair of side walls and a bottom wall, and
         a load component received in the slot, the load component having a pair of ends, first and second longitudinal sides extending between the pair of ends, and a load component flow channel in fluid communication with the nozzle body flow channel and terminating at a respective load component outlet in each end of the pair of ends of the load component; and
      a pair of side-gate tip assemblies, each side-gate tip assembly received in a respective cavity insert and disposed adjacent to a respective end of the pair of ends of the load component, each side-gate tip assembly having a tip member with a tip flow channel in fluid communication between the load component flow channel and a respective mold cavity via a respective mold gate, wherein in operation lengthwise thermal expansion of the load component pushes the pair of side-gate tip assemblies against a respective bearing surface of the respective cavity insert in which each side-gate tip assembly is received to promote a fluid seal between each load component outlet and a respective tip flow channel inlet, each bearing surface of the cavity inserts being perpendicular to the pair of side walls of the slot.

18. The side-gate injection molding apparatus of claim 17, wherein when the side-gate nozzle assembly is unheated a distance between an inlet surface of each side-gate tip assembly is greater than a distance between the pair of ends of the load component.

19. The side-gate injection molding apparatus of claim 17, wherein when the side-gate nozzle assembly is unheated, the load component is longitudinally offset between respective inlet surfaces of each side-gate tip assembly.

20. The side-gate injection molding apparatus of claim 17 further comprising a dowel that extends into the load component and into a wall of the slot, the dowel creating a reference point from which the lengthwise thermal expansion of the load component can be calculated.

21. The side-gate injection molding apparatus of claim 17, wherein a width of the load component, of the side-gate nozzle assembly, as measured between the first and second longitudinal sides of the load component is sized such that when the side-gate nozzle assembly is in operation the first and second longitudinal sides of the load component contact the pair of side walls of the slot.

* * * * *